(12) United States Patent
Babu et al.

(10) Patent No.: US 10,769,747 B2
(45) Date of Patent: Sep. 8, 2020

(54) INTERMEDIATE FRAME GENERATION

(71) Applicant: Intel Corporation, Santa Clara, CA (US)

(72) Inventors: Ravindra A. Babu, Bangalore (IN); Satyanantha R. Musunuri, Bangalore (IN); Sashank Ms, Bangalore (IN); Sagar C. Pawar, Bangalore (IN); Kalyan K. Kaipa, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 15/476,585

(22) Filed: Mar. 31, 2017

(65) Prior Publication Data

US 2018/0286004 A1 Oct. 4, 2018

(51) Int. Cl.
*G06T 1/20* (2006.01)
*G06F 3/0346* (2013.01)
*G06F 3/01* (2006.01)
*G02B 27/01* (2006.01)

(52) U.S. Cl.
CPC .............. *G06T 1/20* (2013.01); *G02B 27/017* (2013.01); *G06F 3/011* (2013.01); *G06F 3/012* (2013.01); *G06F 3/0346* (2013.01); *G02B 2027/014* (2013.01); *G09G 2340/0435* (2013.01)

(58) Field of Classification Search
CPC ....... G06T 1/20; G06T 19/006; G06F 3/0346; G09G 2340/0435
See application file for complete search history.

(56) References Cited

U.S. PATENT DOCUMENTS

| | | | |
|---|---|---|---|
| 2012/0040762 A1* | 2/2012 | Shinjo | A63F 13/02 463/42 |
| 2013/0106872 A1* | 5/2013 | Peng | G09G 3/20 345/519 |
| 2014/0168241 A1* | 6/2014 | Jeganathan | G06T 1/20 345/522 |
| 2014/0184619 A1* | 7/2014 | Kim | G06T 1/20 345/519 |
| 2016/0225348 A1* | 8/2016 | Maiya | G06T 15/005 |
| 2016/0238852 A1* | 8/2016 | Ellsworth | G02B 27/0179 |

OTHER PUBLICATIONS

Peek, Edward, et al., "More for less: Fast image warping for improving the appearance of head tracking on HMDs", 2013 28th International Conference on Image and Vision Computing New Zealand (IVCNZ 2013), pp. 41-46, Nov. 2013 (Year: 2013).*
Sagar C. Pawar et al., U.S. Appl. No. 15/393,159, entitled "Shared Display Links in a User System", filed Dec. 28, 2016, 48 pages.

* cited by examiner

*Primary Examiner* — William A Beutel
(74) *Attorney, Agent, or Firm* — Jordan IP Law, LLC

(57) ABSTRACT

Systems, apparatuses and methods may provide for technology that includes a microcontroller to control a workload of a graphics processor, to determine if at least one predetermined condition is met, and instruct, if the at least one predetermined condition is met, the graphics processor to transform an initial frame into an intermediate frame.

24 Claims, 20 Drawing Sheets

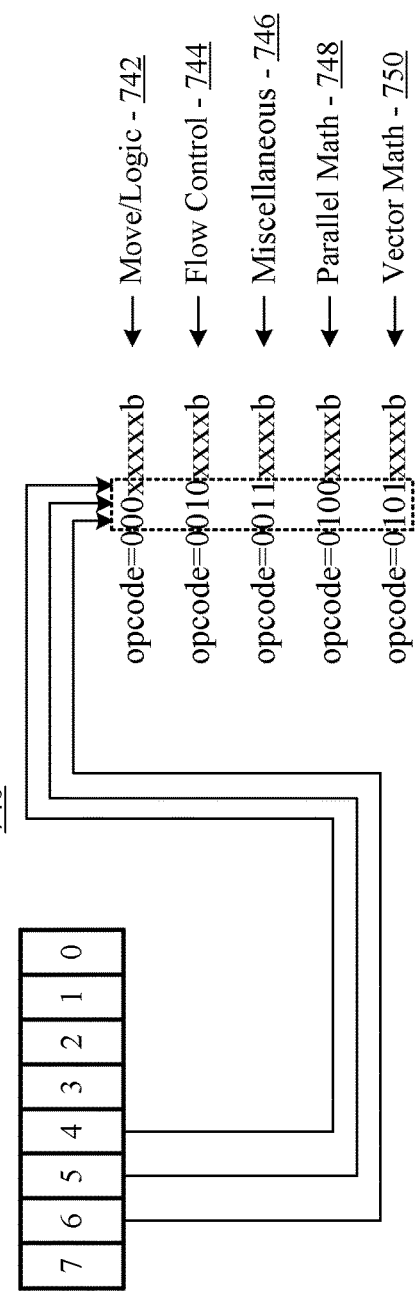
FIG. 15

FIG. 17A Graphics Processor Command Format 900
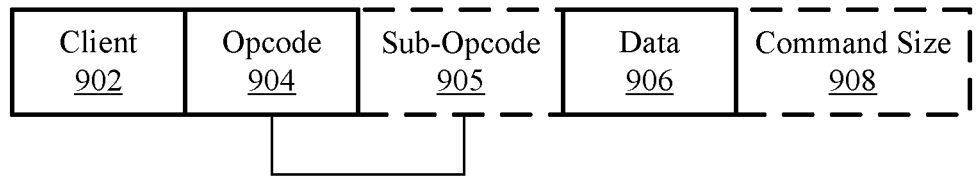
FIG. 17B Graphics Processor Command Sequence 910
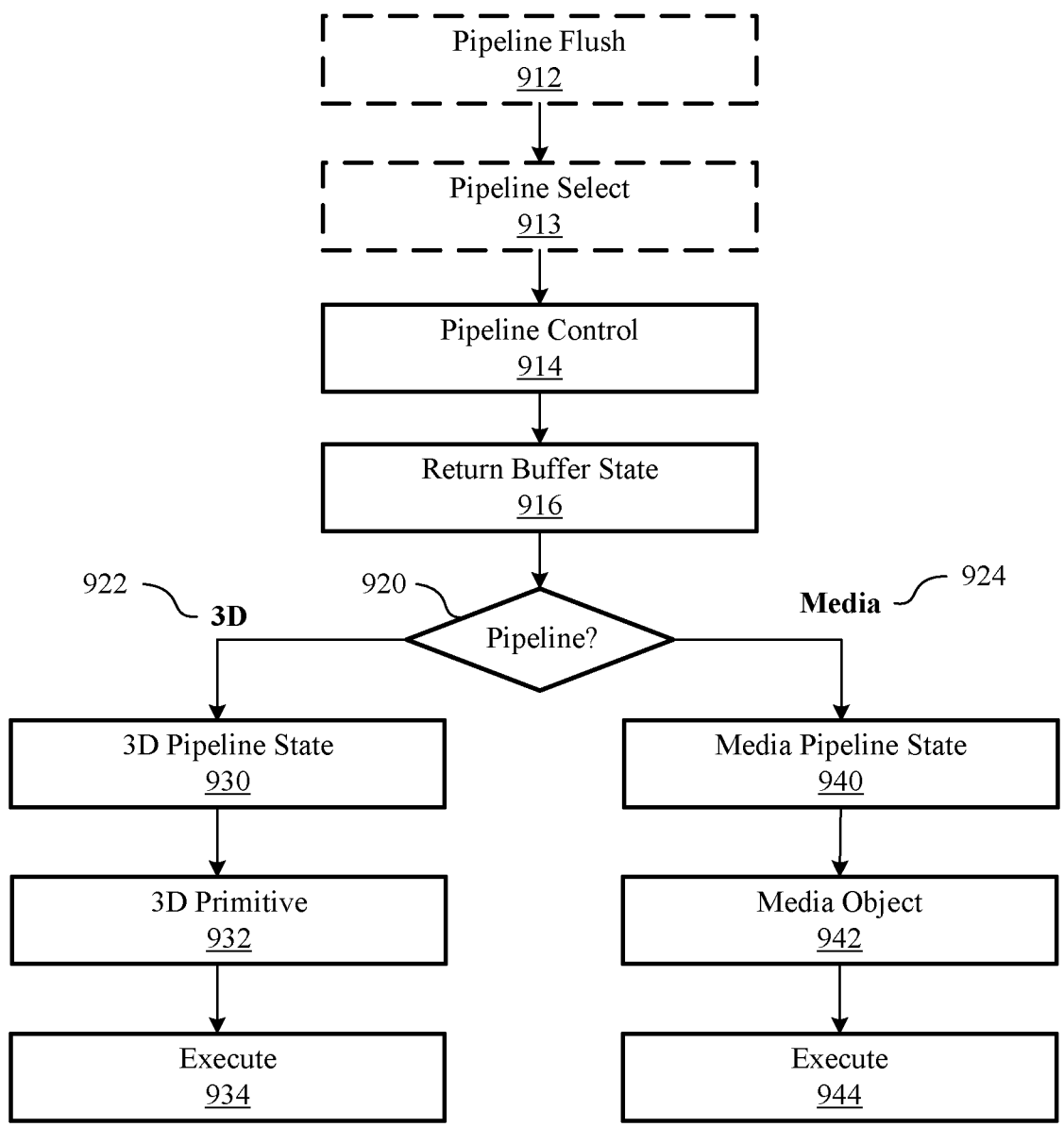

INTERMEDIATE FRAME GENERATION

BACKGROUND

Embodiments generally relate to head mounted display (HMD) systems. More particularly, embodiments relate to intermediate frame generation in HMD systems.

HMDs may be used in virtual reality (VR) and augmented reality (AR) applications to present visual content to the wearer in a wide variety of settings (e.g., immersive games and/or entertainment). A typical HMD may include a display that visually presents an image. In order to render content to the display, image data may be processed. More particularly, game applications may use hardware-accelerated graphics APIs (application programming interfaces) to leverage the capabilities of a local GPU (graphics processing unit), wherein this leveraging can include offloading graphical and non-graphical computation to the GPU in order to maintain interactive frame rates.

BRIEF DESCRIPTION OF THE DRAWINGS

The various advantages of the embodiments will become apparent to one skilled in the art by reading the following specification and appended claims, and by referencing the following drawings, in which:

FIGS. 13-15 are block diagrams of examples of execution units according to an embodiment;

FIGS. 17A-17B are block diagrams of examples of graphics pipeline programming according to an embodiment;

DETAILED DESCRIPTION

Figure 1:
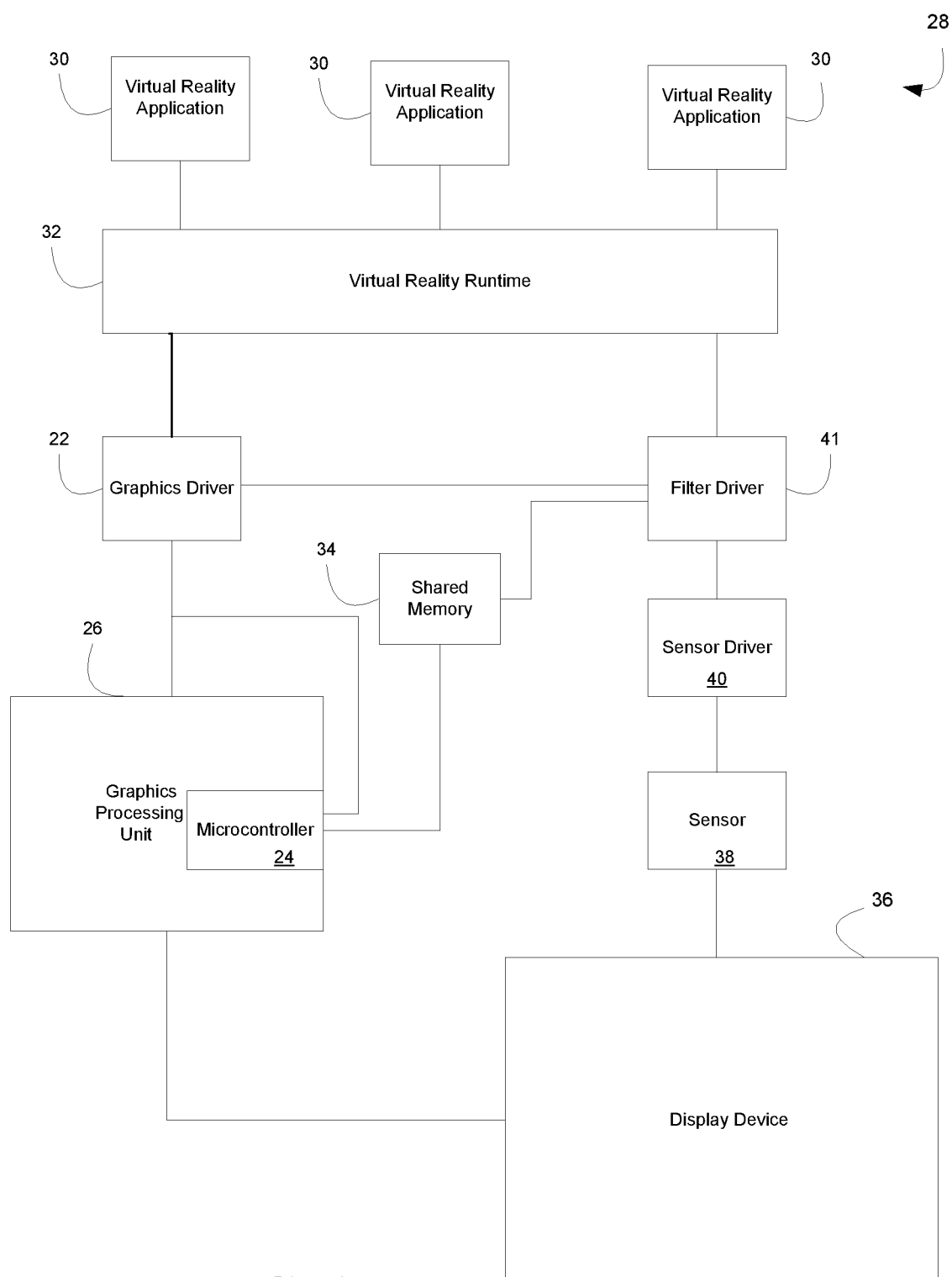
FIG. 1 is an illustration of an example of a computing architecture according to an embodiment.

FIG. 1 illustrates a computing architecture 28. The architecture 28 may include VR applications 30 and VR runtime 32. While the VR applications 30 and the VR runtime 32 are illustrated and discussed, the VR applications 30 and the VR runtime 32 may also be AR applications and AR runtimes respectively, which would then provide AR frames and AR frame flip requests in the below description. Regardless, it will be understood that the following description is not limited to VR, but also includes at least AR.

The architecture 28 may include a graphics processing unit (GPU) 26, which may be referred to as a graphics processor, and a graphics microcontroller (GUC) 24. The GUC 24 may be referred to as a microcontroller, and may be present in a system-on-chip (SOC). For example, the GUC 24 may be a part of the GPU 26. In some embodiments, the GUC 24 may be separate from the GPU 26 but is still part of the SOC, and nonetheless controls the GPU 26 similarly to as discussed herein. The GUC 24 may be implemented in programmable logic, such as, for example, programmable logic arrays (PLAs), field programmable gate arrays (FPGAs), complex programmable logic devices (CPLDs), etc., or any combination thereof. Likewise, the GPU 26 may be implemented in programmable logic such as, for example, PLAs, FPGAs, CPLDs, etc., or any combination thereof. In some embodiments, the GUC 24 may be a separate element from the GPU 26. The GPU 26 may provide frames to a display device 36 via a graphics driver 22. The display device 36 may be a HMD The architecture 28 includes graphics driver 22, a display device 36 and a filter driver 41. Filter driver 41 is connected to the graphics driver 22 and is used to share sensor data from a sensor stack to the graphics driver 22 stack. Another way to transfer sensor data to the GPU 26 and the GUC 24 is through a direct connection between the sensor 38 and the GPU 26 as described in FIG. 5. Frames may be transmitted directly to the display device 36 from the GPU 26.

The graphics driver 22 may provide all frame flip requests and corresponding frames to the GUC 24, rather than directly to another part of the GPU 26. A frame flip request may be an instruction to the GPU 26 to display a corresponding frame on the display device 36. In this manner, the GUC 24 may keep track of all frame flip requests (including the corresponding frames), and furthermore may control the GPU 26 to perform priority rending as discussed below, so that the GUC 24 may render any frame of interest, such as an intermediate frame (IF), by preemption of current GPU 26 workloads at fine granularity.

As illustrated in FIG. 1, several VR applications 30 are illustrated. However, only one VR application 30 may be present. The VR applications 30 may be a VR game or VR video for example. The VR applications 30 may operate in conjunction with the VR runtime 32. The VR runtime 32 may be for example a runtime corresponding to the display device 36. The VR runtime 32 may provide render workload submissions and flip submissions to the graphics driver 22.

From the render workload submissions and flip submissions, the graphics driver 22 may submit a frame flip request to the GUC 24, which controls the GPU 26 to generate a corresponding frame. The graphics driver 22 may provide the frame to the display device 36 so that the display device 36 presents the frame to a user.

The display device 36 may be connected to a sensor 38 and a sensor driver 40 (e.g., a USB driver). In some embodiments, the sensor 38 is a part of the display device 36. The sensor 38 may be an inertial measurement unit to measure movements of a user and display device 36, for example a movement of the user's head or a lateral movement of the user. The measurement of the sensor 38 may also measure a movement of the display device 36, and whether the display device 36 is rotated or moved laterally. The measurements of the sensor 38 may be provided to the sensor driver 40. The sensor driver 40 may provide the measurements to the filter driver 41. The filter driver 41 may analyze the measurements to make inferences from the measurements. For example, the filter driver 41 may transform parts of the measurements into rotational movement data (e.g., whether a rotational movement is occurring, a magnitude of the rotational movement, direction of the rotational movement, etc.), lateral movement data, and so on, which may be collectively referred to as sensor data. This sensor data may be used by the graphics driver 22, and also stored into a shared memory 34 to be used by the GUC 24. The sensor data may also be passed to the VR runtime 32 from the filter driver 41. The filter driver 41 may be a generic interface to the graphics driver 22 and the VR runtime 32.

The filter driver 41 may provide the sensor data to the VR runtime 32, and upon receiving the sensor data, the VR runtime 32 will notify the VR applications 30. The VR applications 30 may then construct a next frame to be flipped using GPU 26 workloads. Once the frame construction is completed, the VR applications 30 will flip the frame though the VR runtime 32, the graphics driver 22 and the GPU 26 to display the frame on the display device 36.

Each of the graphics driver 22, the filter driver 41, the shared memory 34, the VR runtime 32 and the VR applications 30 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations of the graphics driver 22, the filter driver 41, the shared memory 34, the VR runtime 32 and the VR applications 30 may be written in any combination of one or more programming languages, including an object oriented programming language such as C++ or the like and conventional procedural programming languages, such as the "C" programming language or similar programming languages. Moreover, the method of the shared memory 34 may be implemented using any of the herein mentioned circuit technologies. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 2:
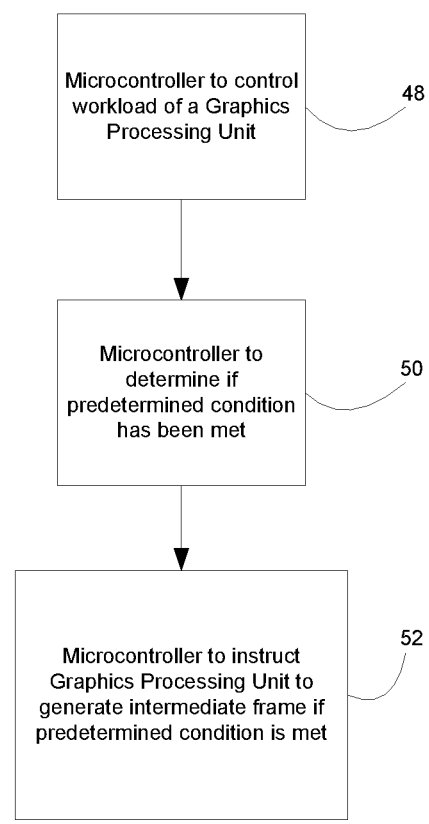
FIG. 2 is a flowchart of an example of a method of operating a computing architecture.

FIG. 2 shows a method 46 of operating the GUC 24. In illustrated block 48 of the method 46 of FIG. 2, the GUC 24 may control the scheduling of the GPU 26 workloads. In some embodiments, the GUC 24 may control the scheduling of all of the GPU 26 workloads. The workloads may include a frame flip request and a corresponding frame. The frame flip request may originate from the VR runtime 32 or VR applications 30.

In illustrated block 50, the GUC 24 may determine if a predetermined condition has been met. The GUC 24 may consider at least one factor. The factor(s) may include, for example, a time until a next vertical blank interval of the display device 36, a render time estimate for frames, sensor data of the sensor 38 which may correspond to movement of the display device 36, perceived frames per second, a frames per second rendered by the GPU 26, frame sensor rotation data measured by the sensor 38, or latest rotation sensor data of the sensor 38 which may correspond to movement of the display device 36.

In illustrated block 52, if the predetermined condition has been met, the GUC 24 may instruct the GPU 26 to perform a priority rendering of an IF by preempting low priority workloads at fine granularity in the GPU 26. The IF may be displayed by the display device 36. For example, the GUC 24 may receive the IF from the GPU 26, and provide the IF to the display device 36 so that the display device 36 displays the IF. The IF may be generated by the GPU 26 based upon spatio-temporal data obtained from the display device 36.

In some VR or AR architectures, providing an immersive VR or AR experience to a user may be difficult. For example, some graphics chipsets do not have enough power to render immersive VR or AR workloads. There may be frame drops, a high judder rate and tearing. The total motion-to-photon (M2P) latency may be important, as this is the time involved for a user movement to be fully reflected on a display screen. For example, keeping the total M2P latency under 18 milliseconds (ms) may enhance the user experience by reducing judder and providing an immersive experience.

The generation of the IF as described above may reduce the M2P to be less than 18 ms. That is, the generation of frames may be reduced to be below 18 ms.

As described above, the capabilities at a kernel level software, which may be device drivers, the GPU 26 and display level may be utilized to generate an IF. In contrast, application level implementations, which may include the VR applications 30 and the VR runtime 32, may generate an IF at a great cost to processing power. For example, in an application level implementation, the sensor 38 may provide data to an operating system (OS) via a connection, such as a Universal Serial Bus. The OS may then provide the data to the VR applications 30 and the VR runtime 32. The VR applications 30 may further receive graphics and display data from the graphics driver 22 in order to generate an IF. However, such a method may not provide a better experience as a current workload queue in a graphics pipeline will be executed first before the IF is generated.

Also, such application level based solutions may not even consider feedback from the display pipeline to determine an ideal moment to generate and display the IF. Therefore, the context for generating the IF may have passed before the IF is displayed. For example, the application based solution may not be optimal as the user may have moved and therefore lost the entire context for the IF generation. However, by utilizing the GUC 24 to determine when to generate an IF, several elements may be bypassed to generate the IF, including the VR runtime 32, the VR applications 30, and the OS stack, which increases efficiency and decreases the M2P.

As noted above, in illustrated block 50, the GUC 24 may determine if the predetermined condition has been met by considering at least one factor (e.g., a time until a next vertical blank interval of the display device 36, a render time estimate for frames, sensor data, a perceived frames per second, a FPS rendered by the GPU 26, frame sensor rotation data, or latest rotation sensor data).

The display feedback may be a time until a next vertical blank interval (vBlank) of the display device 36. The vBlank may correspond to the selected refresh rate of the display device 36. The vBlank may also correspond to the selected FPS of the VR applications 30 and/or the VR runtime 32. The vBlank may be the time at which a frame is completely rendered and displayed by the display device 36, and a new frame is to be displayed by the display device 36. In some embodiments, the vBlank may be the time between frames being displayed by the display device 36. For example, if a selected FPS is 60 FPS, then there are also 60 vBlanks per second. By determining the amount of time until a next vBlank, an IF may be generated at appropriate times and to avoid negative effects, such as tearing.

The time until the next vBlank may be used to determine if an IF is to be generated. In some embodiments, if a frame currently being rendered by the GPU 26 will not be complete before the next vBlank, it may be preferable to generate an IF. So for example, the next vBlank may be in 12 ms, and the frame being rendered by the GPU 26 will take 30 ms to be fully completed. Therefore, the frame being rendered will not be completed before the next vBlank. As such, the GUC 24 may determine that an IF is to be generated so as to be ready by the time of the next vBlank. The IF may then be displayed by the display device 36. The GUC 24 may also detect by how long a vBlank may be missed based upon a current running flip rate, which corresponds to the display device 36 refresh rate.

The GUC 24 may receive timing of the vBlank of the display device 36. So for example, the GUC 24 may be notified whenever a vBlank occurs to determine the current running flip rate. Based upon a timing of the vBlank (or current running flip rate), tearing may be avoided. Tearing is undesirable. For example, the display device 36 may receive a frame to be displayed, and begins to display the frame. Only part of the frame may be displayed by the display device 36 because the remainder has not yet been displayed by the display device 36. If an IF is then provided to the display device 36 to be displayed, the remainder of the frame may not be displayed. Rather, the part of the frame may be displayed and part of the IF may be displayed. The border between the IF and the part of the frame forms a phenomenon called tearing, which is undesirable.

The GUC 24 may have access to elements of the GPU 26 and the graphics driver 22, so as to be able to determine various parameters. For example, the GUC 24 may be able to determine at what time a frame flip request and frame is submitted, when the frame rendering is completed by the GPU 26, how long the frame rendering took to complete, when the frame is sent to the display device 36, when the frame is displayed by the display device 36, whether the entire frame was displayed by the display device 36 or only a part of the frame was able to be displayed because the frame was not provided in a timely fashion. By doing so, the GUC 24 may calculate the time it takes to process a frame flip request and corresponding frame for example, and other factors.

The render time estimate may be based on previously generated frames in the current workload of the GPU 26. The GUC 24 may receive all frame render requests and corresponding frames for the GPU 26 from the graphics driver 22. The GUC 24 may also detect when the frame render requests and frames are completed. Based upon this, the GUC 24 may determine the amount of time the GPU 26 requires to generate the frames, and determine an average render time per frame, which is the render time estimate. Therefore, the GUC 24 may determine an estimate of time required to render a frame, from a point of submission of the frame render request to a point of completion. For example, the frame render request may be time from when the frame render request and frame is submitted to GPU 26 by the GUC 24 and completed by the GPU 26.

The sensor data may be temporally contextual sensor raw data. In FIG. 1, the GUC 24 may retrieve the sensor data from the shared memory 34. As discussed above, the filter driver 41 may transform parts of the measurements into rotational movement data (e.g., whether a rotational movement is occurring, a magnitude of the rotational movement, direction of the rotational movement, etc.), lateral movement data, and so on. This data may be used by the graphics driver 22, and also stored into the shared memory 34 to be used by the GUC 24. The GUC 24 may utilize this information to determine whether an IF should be generated.

Further, such sensor data may be available directly to the GUC 24 while generating the IF, as described below with respect to computing architecture 44 of FIG. 5.

The perceived frames per second (PFPS) may be a target FPS of the VR applications 30 and/or the VR runtime 32 to provide an optimal VR experience. If the target FPS (PFPS) is greater than the FPS rendered by the GPU 26, IFs may be generated so that the user observes the target FPS. For example, severe judder would be caused if the GPU 26 can render frames at 24 FPS, but the VR applications 30 require that content displayed by the display device 36 has 48 FPS to provide for an immersive experience. Therefore, the content would be choppy and users may have motion sickness. In such a case, it may be preferable to provide IFs every other frame so that it appears to the user that GPU 26 is providing 48 FPS. For example, the GPU 26 may render 24 FPS and generate IFs at 24 FPS. Therefore, if the PFPS (i.e., the target FPS) is greater than the FPS generated by the GPU 26, then it may be preferable to generate IFs.

Figure 3:
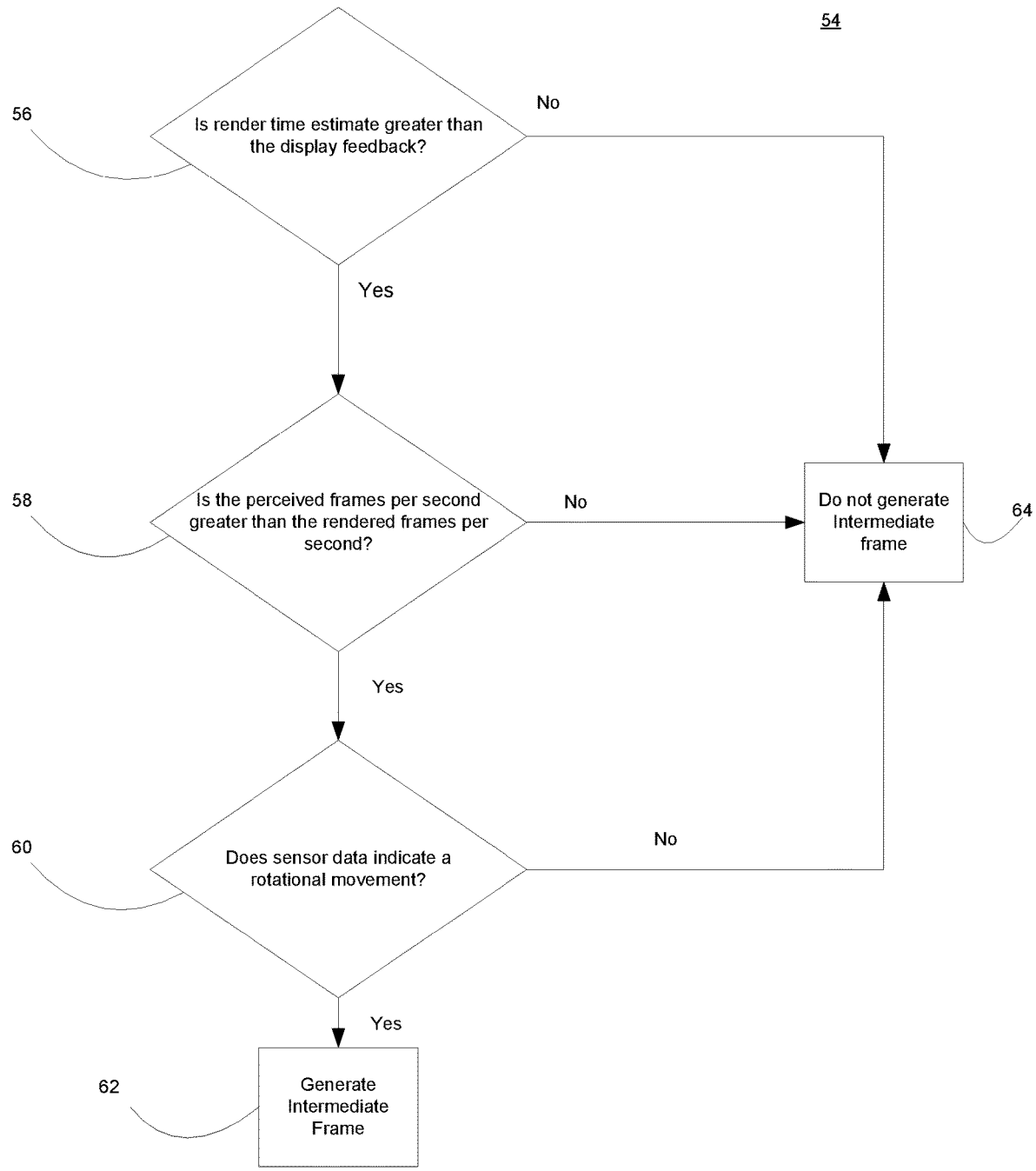
FIG. 3 is a flowchart of an example of a method of operating a computing architecture.

FIG. 3 illustrates a method 54 to generate an IF, and may be implemented by at least the GUC 24. Method 54 may correspond to illustrated blocks 50 and 52 of method 46. In method 54, the order of the illustrated blocks 56, 58, 60 is irrelevant. That is, illustrated blocks 56, 58, 60 may be performed in any order. For example, illustrated block 58 could be performed before illustrated block 56 and lead to illustrated block 56. The GUC 24 may use the PFPS, the sensor data, the render time estimate, the frames per second rendered by the GPU 26 and the display feedback to determine if an IF should be generated.

In illustrated block 56, a determination is made if the render time estimate is greater than the display feedback (i.e., the time until the next vBlank). If not, the GUC 24 may determine that no IF is required, and does not generate an IF at block 64. If the render time estimate is greater than the display feedback, the GUC 24 may determine in block 58 if the PFPS is greater than the FPS rendered by the GPU 26.

If the GUC 24 determines that the PFPS is equal to or less than the FPS of the GPU 26, the GUC 24 may determine that no IF is required, and does not generate an IF at block 64. If the PFPS is greater than the FPS rendered by the GPU 26, the GUC 24 may consider the sensor data in block 60.

That is, in block 60 the GUC 24 may determine whether sensor data of the sensor 38 indicates a rotational movement of the display device 36 has occurred. The sensor data may reflect a movement of a user utilizing the display device 36, in the time period since the last frame was displayed by the display device 36. In some embodiments, the sensor data may reflect a movement of the user of the display device 36 and the display device 36 only in the time period since the last frame was displayed by the display device 36. If a rotational movement has occurred, the GUC 24 may finally instruct the GPU 26 to generate an IF in illustrated block 62.

The IF may be a rotationally transformed flipped frame. For example, the IF may be the last frame displayed by the display device 36 modified by a rotation transformation.

If the sensor data indicates no rotational movement has occurred, then the GUC 24 may determine that no IF is to be generated, and the method moves to illustrated block 64.

In some embodiments in illustrated block 60, an IF may only be generated if the sensor data indicates that only rotational motion has occurred. For example, an IF would not be generated and the method would proceed to illustrated block 64, if the sensor data indicates that lateral motion has occurred, regardless of whether the sensor data indicates that rotational motion has occurred.

The GUC 24 may have an internal timer that is set and calibrated continuously based upon PFPS, the sensor data, the render time estimate and the display feedback as well. Thus, the GUC 24 may also decide whether to generate an IF, and the timing for the generation. Therefore, an IF may be generated when a next frame will not meet the target FPS of the VR applications 30 and/or the VR runtime 32, and there is enough time to generate the IF before a next vBlank occurs to avoid tearing.

For VR and AR workloads, motion to photon latency should be less than 18-21 ms to avoid any judder and have better user immersion into the virtual world. This will give around 16 ms for rendering to finish on the GPU 26 and flip the frame onto display. If the GPU 26 is taking more time to construct VR frames, the architecture 28 may show "stale" frames for more time which will not match to end-user movement.

In cases where there the GPU 26 is dropping frames and the head movement of a user and display device 36 is only rotation, implementing the embodiments described herein may improve the generated frame rate. For example, while the next frame is getting constructed by the GPU 26, an IF, which is the last flipped frame displayed with a rotation transformation, may be flipped within 16 ms to be displayed. The rotation transformation may be based on data from the sensor 38. The IF may be flipped within 16 ms, which will give a sense of continuity to the user. Moreover, as this process is within 16 ms, head movement of a user typically will not be drastic and may be within approximately 2-3 degrees. This will not cause any perceptible data loss in the transformed IF relative to the user's experience.

Figure 4:
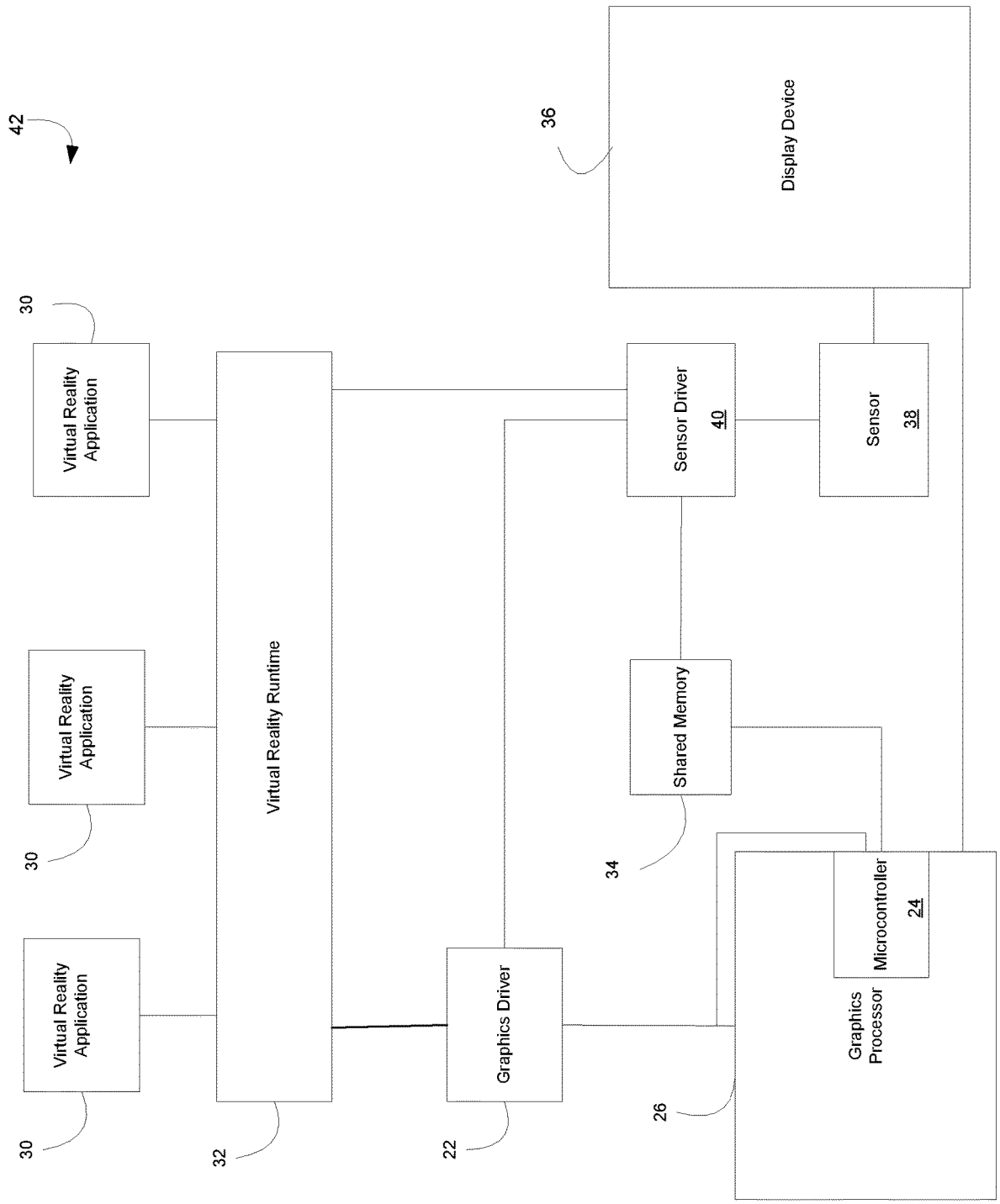
FIG. 4 is an illustration of an example of a computing architecture according to an embodiment.

FIG. 4 illustrates an embodiment of a computing architecture 42 in which the sensor driver 40 stores the sensor data of the sensor 38 directly into the shared memory 34, rather than the filter driver 41 storing the sensor data of the sensor 38 into the shared memory 34. With this exception however, the illustrated components of FIG. 4, such as the GUC 24, the graphics driver 22 and the GPU 26, operate similarly to as described with respect to FIGS. 1-3. For example, the GUC 24 receives the sensor data from the shared memory 34 and may use the sensor data to determine if an IF is to be generated.

Figure 5:
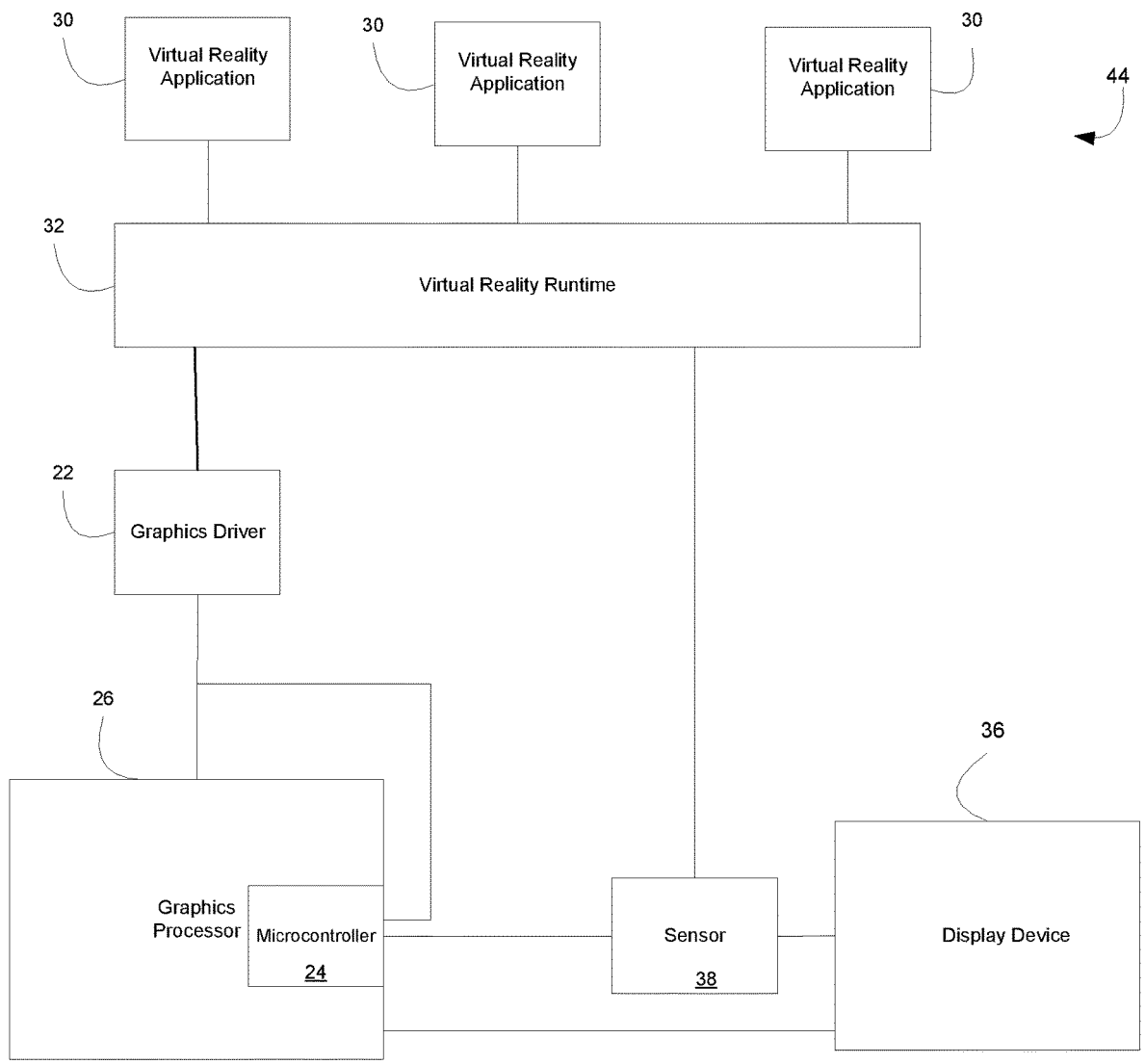
FIG. 5 is an illustration of an example of a computing architecture according to an embodiment.

FIG. 5 illustrates an embodiment of computing architecture 44 in which the sensor 38 provides the sensor data to the GUC 24, rather than through the shared memory 34. A connection between the sensor 38 and the GUC 24 may include a universal serial bus (USB) cord, display cord, a mobile industry processor interface display serial interface (MIPI-DSI) cable, and so on. The connection may be a direct link. The direct link may be through any industry standard connector technology where MIPI-DSI/USB are a few of the possible implantations. Such implementations are described below.

In some embodiments, the sensor 38 may utilize a non-display general purpose communication bus protocol, such as a selected one of a serial peripheral interface (SPI) protocol, a scalable coherent interface (SCI) protocol, a small computer system interface (SCSI) protocol, a USB protocol, a peripheral component interconnect (PCI) protocol, or an inter-integrated circuit ($I^2C$) protocol. In contrast, the GPU 26 may utilize a display protocol, such as a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol. In some embodiments, the sensor 38 may utilize a wireless protocol.

In some embodiments, an aggregator (not illustrated) may include a controller (not illustrated), which may be a computer or a computing device, to facilitate information communicated among multiple devices, for example the sensor 38 and the GPU 26 of computing architecture 44, through links. Information communicated among the devices may include data, or multimedia. The controller may facilitate to convert information from a first device (e.g., the sensor 38) in a first format based on a first protocol into a second format based on a second protocol to be transferred to a second device, for example, the GPU 26. For example, the controller may facilitate to convert information from the sensor 38, in a format based on a protocol of the sensor 38, into a format based on a protocol to be further transferred to the GPU 26. A protocol may be a set of rules that allow two devices to communicate information on a link between them. Similarly, the controller may facilitate to convert information from the GPU 26 in a format based on the protocol of the GPU 26 into formats based on the protocol of the sensor 38. Furthermore, the protocols of the GPU 26 and the sensor 38 may be the same, and the controller may simply facilitate the aggregator to pass information in a same format based on the protocols between the sensor 38 and the GPU 26.

With this exception however, the illustrated components of the computing architecture 44 of FIG. 5, such as the GUC 24, the graphics driver 22 and the GPU 26, operate similarly to as described with respect to FIGS. 1-3. For example, the GUC 24 stores the sensor data directly from the sensor 38, and may use the sensor data to determine if an IF is to be generated.

Therefore, there may be several ways for the GUC 24 to receive the sensor data, as described with respect to FIGS. 1 and 4-5. For example, the GUC 24 may receive the sensor data through a direct link to the GPU 26 as in the embodiment of FIG. 5, and also receive sensor data from the shared memory 34 as in the embodiments of FIGS. 1 and 4. Moreover, there may be redundant ways for the GUC 24 to receive the sensor data, such as for example by combining various features of the architectures 28, 42, 44 of FIGS. 1, 4 and 5. Thus, the GUC 24 may receive the sensor data in several different ways.

Figure 6:
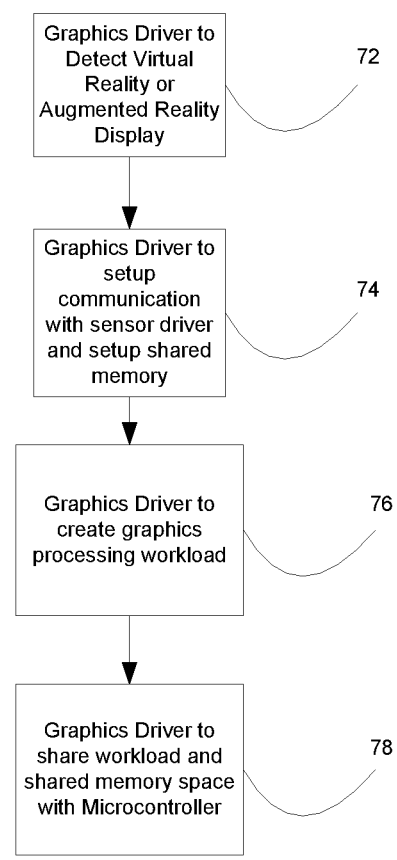
FIG. 6 is a flowchart of an example of a method of providing a computing architecture.

FIG. 6 illustrates a method 70 to set up a pipeline to generate VR or AR IFs. This pipeline may be illustrated in FIG. 1 for example.

In illustrated block 72, the graphics driver 22 is to detect a VR or AR display. For example, the graphics driver 22 may detect the VR display 36 during boot time or upon "hot-plug" of the VR or AR display 36. In some embodiments, the graphics driver 22 will detect the presence of any VR or AR display connected to the graphics driver 22. No further action may be taken until a VR or AR display is detected.

In illustrated block 74, when a VR or AR display, for example the display device 36, is detected, the graphics driver 22 may establish driver-to-driver communication with the sensor driver 40 which is registered into a sensor stack. The graphics driver 22 may further allocate memory, for example the shared memory 34, and share it with sensor driver 40. The sensor driver 40 may use the shared memory 34 to store the latest sensor data (e.g., gyro rotation data in quaternion). The sensor driver 40 may further interact with the filter driver 41 to save the latest sensor data into the shared memory 34. The graphics driver 22 maps the shared memory 34 into its address space so that the GUC 24 may be given access to the shared memory 34.

Further, in illustrated block 76, the graphics driver 22 creates the GPU 26 workload which takes quaternion rotation data. The quaternion rotation data may be applied to an input frame so as to produce a rotated output frame as an IF. The graphics driver 22 may allocate a required memory and handle memory mapping into the GPU 26 address space to allow for the workload to be passed to the GPU 26, including passing the quaternion rotation data to the GPU 26 via the GUC 24.

In illustrated block 78, the graphics driver 22 may share workload and the shared memory 34 details to the GUC 24. The pipeline to generate VR or AR IFs may now operate. However, there are several ways to set up the above pipeline, depending upon the architecture 28, 42, 44 of FIGS. 1, 4 and 5.

Therefore, the above pipeline generation method may be adjusted for FIG. 4 by allowing the graphics driver to share the shared memory 34 with the sensor 38. In FIG. 5 however, no shared memory 34 is necessary and therefore does not require to be generated, since the sensor 38 communicates directly with the GUC 24.

Figure 7:
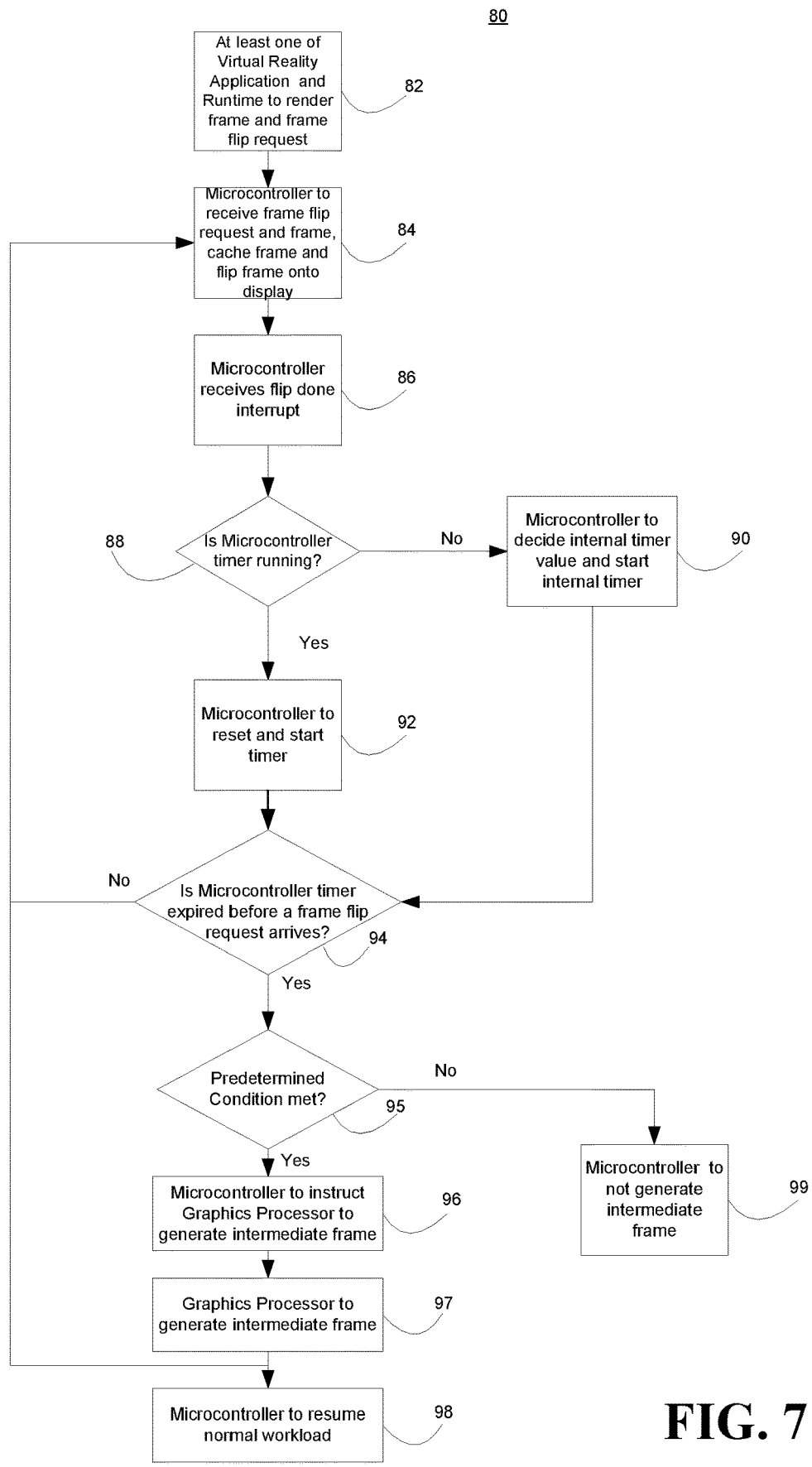
FIG. 7 is a flowchart of an example of a method of operating a computing architecture.

FIG. 7 illustrates a method 80 to generate an IF. In illustrated block 82, the VR applications 30 and/or VR runtime 32 may render a frame and a corresponding frame flip request. These may be the first frame and frame flip request.

In illustrated block 84, the GUC 24 receives the frame flip request and the frame. That is, all workload submission to GPU 26 may go through the GUC 24. If a VR workload is detected, VR flips and frames will also be redirected to the GUC 24. Upon receiving the frame flip request and the frame, the GUC 24 will cache the frame, and control the GPU 26 to flip the frame onto the display device 36.

In illustrated block 86, the GUC 24 may receive a flip done interrupt. A flip done interrupt is a notification to the GUC 24 that a new frame is being displayed on the display device 36. This interrupt may allow the GUC 24 to calculate the display feedback (e.g., vBlank) as described above and help in deciding whether an IF generation is required or not.

In illustrated block 88, the GUC 24 determines if a timer of the GUC 24 is running. If the timer is not running, the frame may be the first frame and proceeds to illustrated block 90. In illustrated block 90, the GUC 24 will set the internal timer for a configurable value, and start the timer. This value may be chosen in such a way that delay of a next flip beyond that value can result in a less immersive VR or AR experience, such as by causing judder. The GUC 24 may decide the timer value based upon the target FPS, a current hardware scan line and a display refresh rate of the display device 36 for example. The timer value may be based upon PFPS, the sensor data, the render time estimate and the display feedback.

If in illustrated block 88, the GUC 24 timer is running, the method may move to illustrated block 92. In illustrated block 92, the GUC 24 will reset the timer count and restart the timer.

In illustrated block 94, the GUC 24 determines if the timer has expired (i.e., if the timer count has reached the internal timer value) before another next frame flip request and corresponding frame arrives. If the timer has not expired before the next frame flip request arrives, the GUC 24 will repeat the method 80 starting at illustrated block 84, cache the frame of the next frame flip request, and then reset the timer in illustrated block 92

If the timer has expired, because for example the next frame flip request is delayed and does not arrive, the GUC 24 will determine whether an IF should be generated based upon the conditions in illustrated block 96. For example, the GUC 24 may follow a similar method 54 as illustrated in FIG. 3 and the corresponding description, to determine whether an IF is to be generated. In some embodiments, the GUC 24 may only consider whether a rotational movement of the user of the display device 36 has occurred, and instruct the GPU 26 to generate an IF when the rotational movement has occurred. In some embodiments, the method may omit illustrated block 95 and simply proceed to illustrated block 96 from illustrated block 95.

In illustrated block 99, the GUC 24 does not generate an IF because the conditions have not been met in illustrated block 95. While not illustrated, the method may be modified to return to illustrated block 84 from illustrated block 99.

In illustrated block 96, the GUC 24 may generate an IF because the conditions have been met in illustrated block 95. In some embodiments the GUC 24 may omit illustrated block 95, and in which case the method 80 would have proceeded directly to illustrated block 96 from illustrated block 94. The GUC 24 may read a latest sensor data from the sensor 38. For example, the GUC 24 may read the sensor data from the shared memory 34 as in the computing architectures 28, 42 of FIGS. 1 and 4, or receive the sensor data from the sensor 38 as in the computing architecture 44 of FIG. 5. In some embodiments, the GUC 24 may preempt a current running GPU 26 workload at highest possible granularity and submit the transformation workload to the GPU 26 to build the IF. The inputs for the transformation workload may be the last cached frame of the GUC 24, which may correspond to the frame last displayed by the display device 36, and the sensor data (e.g. gyro rotation data in quaternion), which may be read from the shared memory 34.

Once the IF is generated in illustrated block 97, the GUC 24 will flip the IF onto the display device 36. The method 80 then proceeds to both illustrated block 98 and illustrated block 84, to cache the IF and eventually reset the timer again in illustrated block 92

There may be some advantages to the embodiments described herein. For example, temporally contextual sensor raw data is available directly to the GUC 24 through MIPI or DISI lane as described with respect to the computing architecture 44 of FIG. 5. For example, it may be possible to reduce driver latency and additional cables used in a computing architecture by multiplexing sensor data of sensor 38 over a MIPI-DSI-DO lane. In contrast, generating an IF by transmitting sensor data through a USB connection to the OS, and then to the application stack, for example the VR runtime 32 and the VR applications 30, adds multiple delays. Thus, delays may be reduced.

Furthermore, the perceived improvement is higher when the decision to generate an IF is implemented in the GUC 24 rather than other applications, for example the VR applications 30 or the VR runtime 32, or OS layers.

Moreover, the methods described herein may be implemented in the GUC 24. As such, existing gaming and the VR applications 30 do not require changes to improve the end user experience.

Furthermore, the methods described herein are not reliant on specific types of applications, OS or virtual reality manufacturers.

Moreover, the overall computing processing overhead used to schedule and generate an IF is reduced. This reduces the overall power consumption by the architectures 28, 42, 44 as this allows the architecture 28, 42, 44 to get into a lower C-State, which may be an idle power saving state, more often.

Further, the desired possible granularity of preemption is Mid-Object preemption on VR workloads, and may take less time than other methods of generating an IF. For example, according to some embodiments the whole runtime sequence overhead to generate the IF may be calculated as below:

1) Scheduling a preemption packet to the GPU 26 by the GUC 24 and the GPU 26 preempting a current running workload takes around 0.1-0.3 ms; and 2) Transformation of workload execution on the GPU 26 to generate an IF may be around 2-3 ms for 2K resolution.

Furthermore, forming the pipeline for the above methods described herein may only need to occur once, while the runtime sequence described above may require around 2.5 ms-3.5 ms. Forming the pipeline is discussed further with respect to FIG. 6.

In contrast, some systems take between around 20 ms-around 120 ms to generate a final composited VR or AR work load frame depending on a 3D render complexity of the application. Since the acceptable motion to photon latency is 18 ms, the user may experience judder. In contrast, with a total overhead of around 2.5 ms-3.5 ms for a 2K×16 content, the methods 46, 54, 80 may increase the user observed FPS by 24-30 FPS and thereby enhancing the experience.

Figure 8:
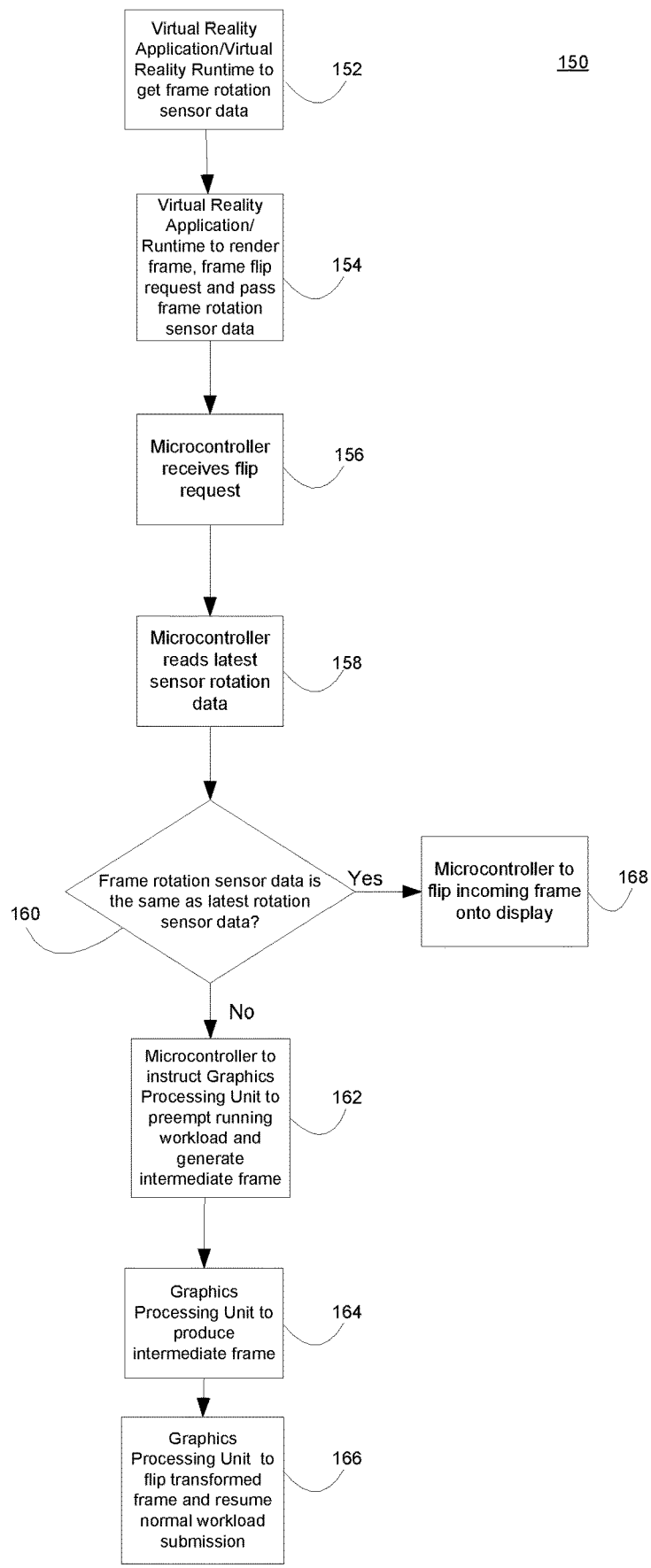
FIG. 8 is a flowchart of an example of a method of operating a computing architecture.

FIG. 8 illustrates a method 150 to generate an IF. The method 150 for example may operate with any of the embodiments of FIGS. 1, 2, 4, 5 and 6 and for example. Furthermore, method 150 may correspond to illustrated blocks 50, 52 of the method 46 of FIG. 2.

As noted above, for VR workloads, M2P latency should be less than about 10-20 ms to avoid judder and have better user immersion into virtual world. This will give about 16 ms for rendering a frame to finish on the GPU 26 and to be flipped onto the display device 36. Because of continuous user motion, new sensor data from the sensor 38 will be fed continuously. In some cases, the latest rotation sensor data used for frame construction may become stale due to such delays. There may several reasons for such a delay in rendering the frame, for example delays may be caused by the VR applications 30, the VR runtime 32, the graphics driver 22 and so on. Such delays may result in a mismatch between end-user movement and currently displayed VR frame.

In some embodiments where there the GPU 26 may drop frames and the head movement and display device 36 movement includes rotation, the following steps may be added to the graphics pipeline to improve the accuracy of a displayed VR frame. When the VR frame is requested for flip onto the display device 36, the GUC 24 may read the latest rotation sensor data. If a change in position is only in a head rotation angle or display device 36 rotation angle, the GUC 24 may instruct the GPU 26 to apply a rotation transformation to the VR frame using the latest rotation sensor data and display the transformed frame. Therefore, the displayed frame will match the user head movement with better accuracy. Therefore, the latest rotation sensor data may be fused with a displayed VR frame.

All the workload submission to the GPU 26 may go through the GUC 24. If a VR workload is detected, VR flips will also be redirected to the GUC 24. As noted above, in illustrated block 50 of the method 46 of FIG. 2, the GUC 24 may determine if the predetermined condition has been met by considering at least one factor from a frame rotation sensor data, and a latest rotation sensor data of the display device 36. This is explained below in further detail.

In illustrated block 152, the VR applications 30 and/or the VR runtime 32 receives frame rotation sensor data, which may be detected by the sensor 38, which includes rotation information data of the display device 36. The frame rotation sensor data may correspond to an event for a frame construction of a frame.

In illustrated block 154, the VR applications 30 and/or the VR runtime 32 may render a frame and a frame flip request based in part upon the frame rotation sensor data. The frame rotation sensor data, which is used for the frame rendering or to construct the frame, will be passed to the graphics driver 22 along with the frame flip request and the frame. The frame may not have been previously displayed by the display device 36.

In illustrated block 156, the graphics driver 22 will forward the frame flip request and frame to the GUC 24 along with the frame rotation sensor data. The GUC 24 may determine when a previous frame flip occurred and determine the display feedback (e.g., the vBlank), to determine if the frame flip will be timely provided to the display device 6.

In illustrated block 158, the GUC 24 will also read the latest rotation sensor data. The latest rotation sensor data is determined, for example by the sensor 38, after the frame rotation sensor data, and therefore may correspond more closely to a recent movement of the display device 36. The latest rotation sensor data may be stored in the shared memory 34, as in the computing architectures 28, 44 as in the embodiments of FIGS. 1 and 4, or the GUC 24 may receive the latest rotation sensor data directly from the sensor 38 as in the computing architecture 44 of the embodiment of FIG. 5. As discussed above, there are several methods for the GUC 24 to receive the latest rotation sensor data. The latest rotation sensor data may indicate if a user has moved the display device 36 in the time since the frame rotation sensor data was first detected. For example, if the latest rotation sensor data does not equal the frame rotation sensor data, then a user may have moved in the interim time period between a time the frame rotation sensor data was measured and the frame was generated, and a time the latest rotation sensor data was measured.

In illustrated block 160, The GUC 24 will compare a rotation value between the latest rotation sensor data and the frame rotation sensor data. If the frame rotation sensor data is the same as the latest rotation sensor data, the method may proceed to illustrated box 168. In illustrated box 168, the GUC 24 may instruct the GPU 26 to flip the incoming frame onto the display device 36. For example, the frame may not have a rotational transformation applied thereto by the GPU 26.

If, however the frame rotation sensor data is not the same as the latest rotation sensor data, for example a user has moved, for example by rotating the display device 36, in the time since the frame was determined to be generated by the VR applications 30 and/or the VR runtime 32, the method proceeds to illustrated box 162. In illustrated box 162, the GUC 24 will instruct the GPU 26 to preempt a current running GPU 26 workload and submit to the GPU 26 a transformation workload to be applied to the incoming frame to generate an IF. In some embodiments, the inputs for this workload may be the incoming frame to be flipped, and the latest rotation sensor data (e.g., gyro rotation data in quaternion).

In illustrated block 164, the GPU 26 generates the IF. For example, a rotational transformation is applied to the frame, which was generated by the VR applications 30 and/or the VR runtime 32 in illustrated block 1, to form the IF.

In illustrated block 166, once the IF is generated, the GUC 24 will instruct the GPU 26 to flip the IF output onto the VR display 6, and the normal workload submission is resumed.

The GPU 26 will then resume an earlier preempted workload.

In some embodiments, it may take approximately 2.5 ms-3.5 ms to correct a 2K×16 VR or AR frame on some platforms, which are three-dimensional platforms. The above method 150 described in FIG. 8 may be modified by taking hardware scan line status into consideration or the vBlank, similarly to as discussed with respect to previous embodiments. By doing so, a VR or AR frame correction for accuracy may be attempted only when a frame drop may be avoided. Furthermore, the workload to set up a pipeline to transform an input frame is one-time setup, and may be similarly performed as discussed with respect to FIG. 6. In some embodiments, with the GUC 24, running workloads of the GPU 26 may be preempted at highest possible granularity. So, there may be minimal overhead to submit a transformation workload to the GPU 26. This may facilitate in ensuring that frames are accurate and correspond to a user's head movements.

Moreover, the latest rotation sensor data may be read as late as possible by the direct connection between the sensor 38 and the GUC 24 as illustrated and discussed in FIG. 5, to enhance the context of the IF.

System Overview

Figure 9:
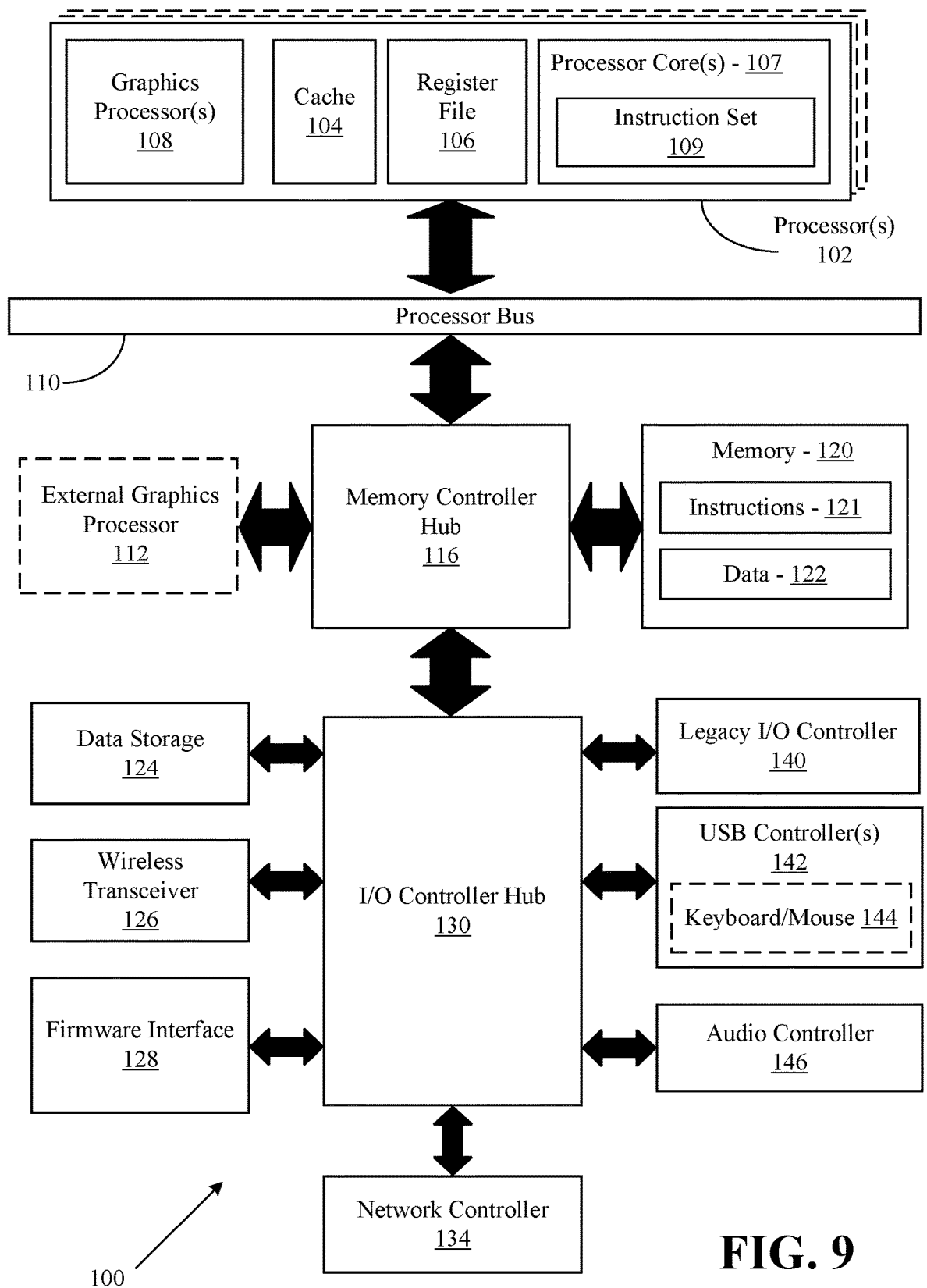
FIGS. 9-11 are block diagrams of an example of an overview of a data processing system according to an embodiment.

FIG. 9 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 10:
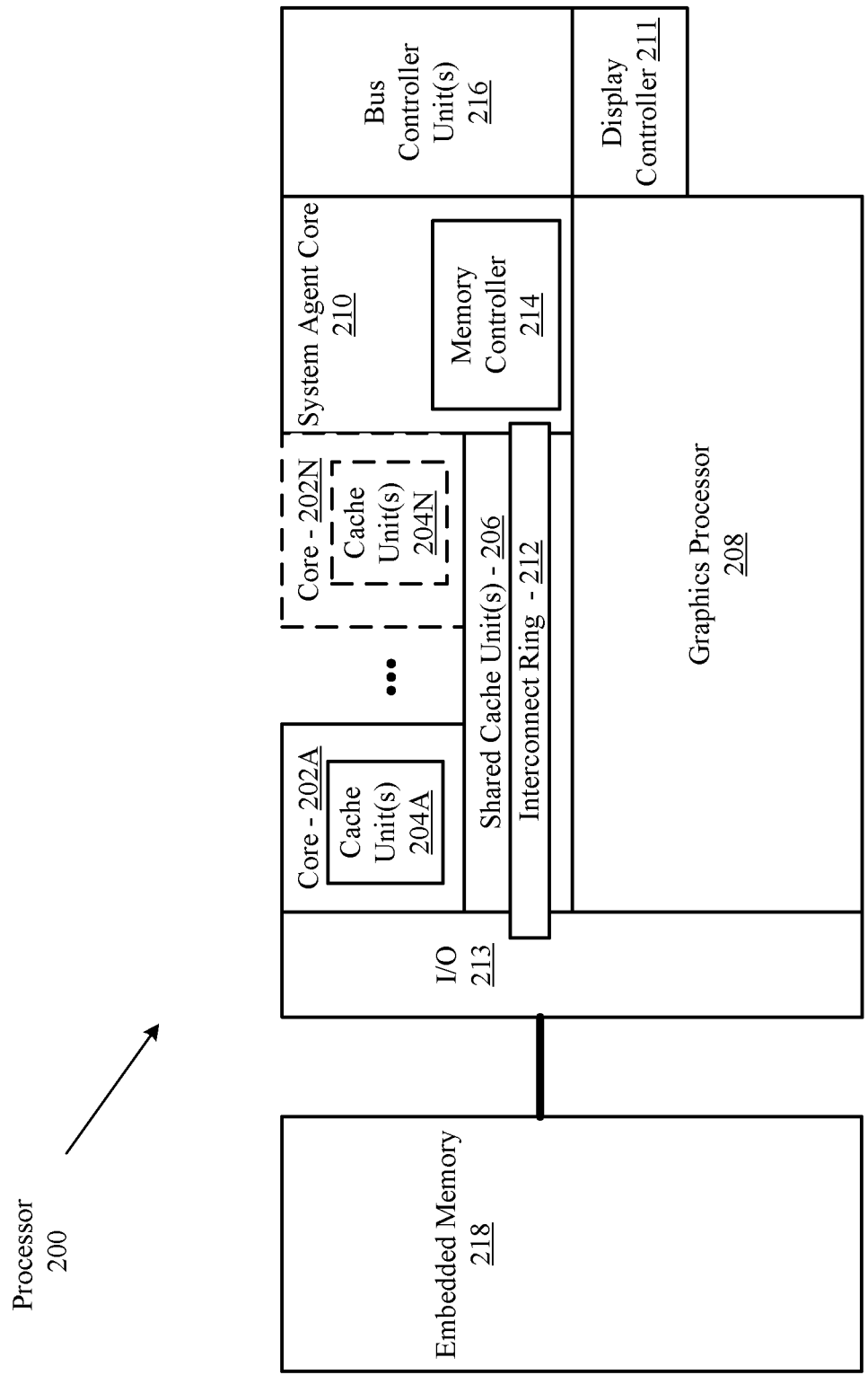

FIG. 10 is a block diagram of an embodiment of a processor 200 having one or more processor cores 202A-202N, an integrated memory controller 214, and an integrated graphics processor 208. Those elements of FIG. 10 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 11:
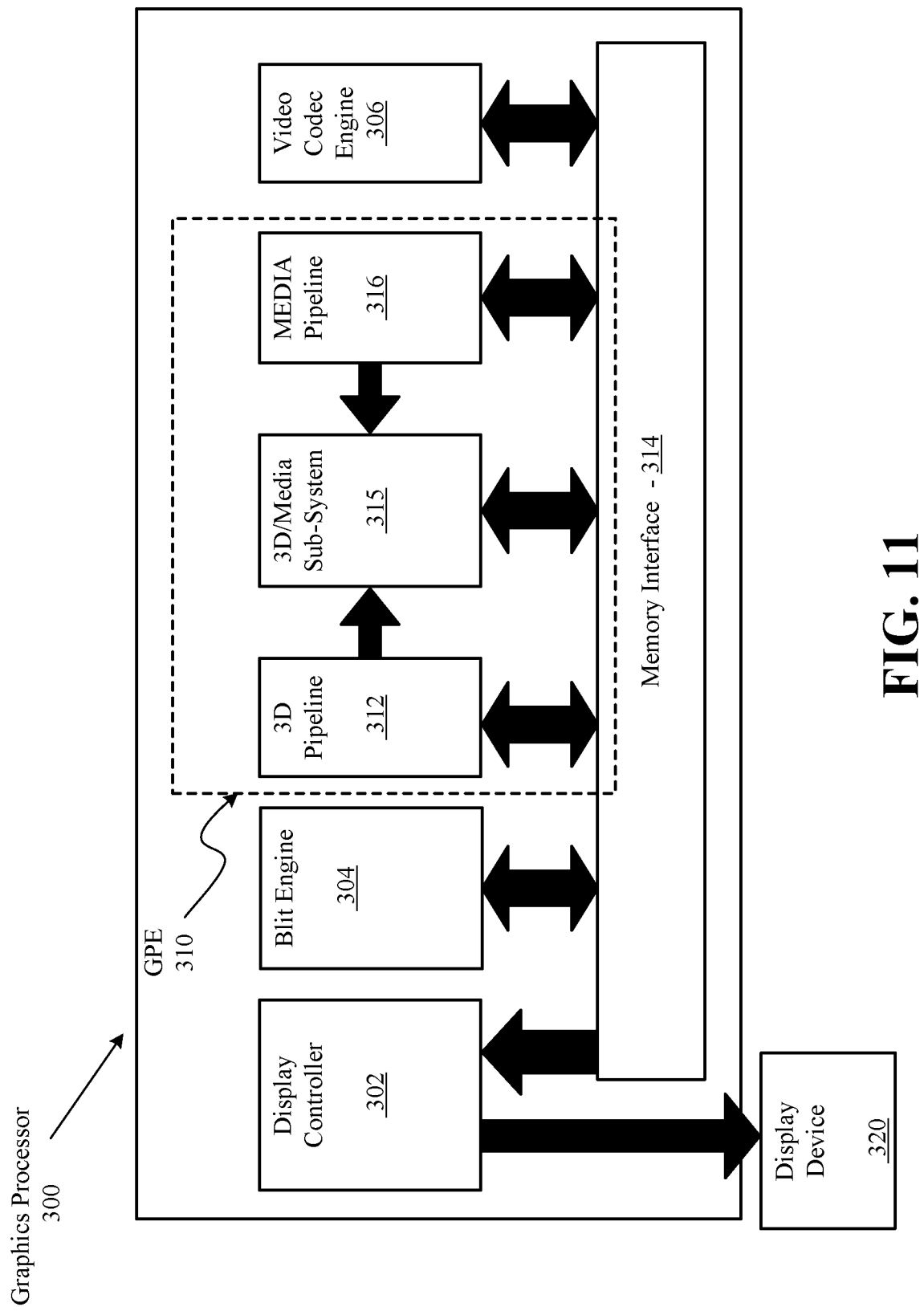

FIG. 11 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 12:
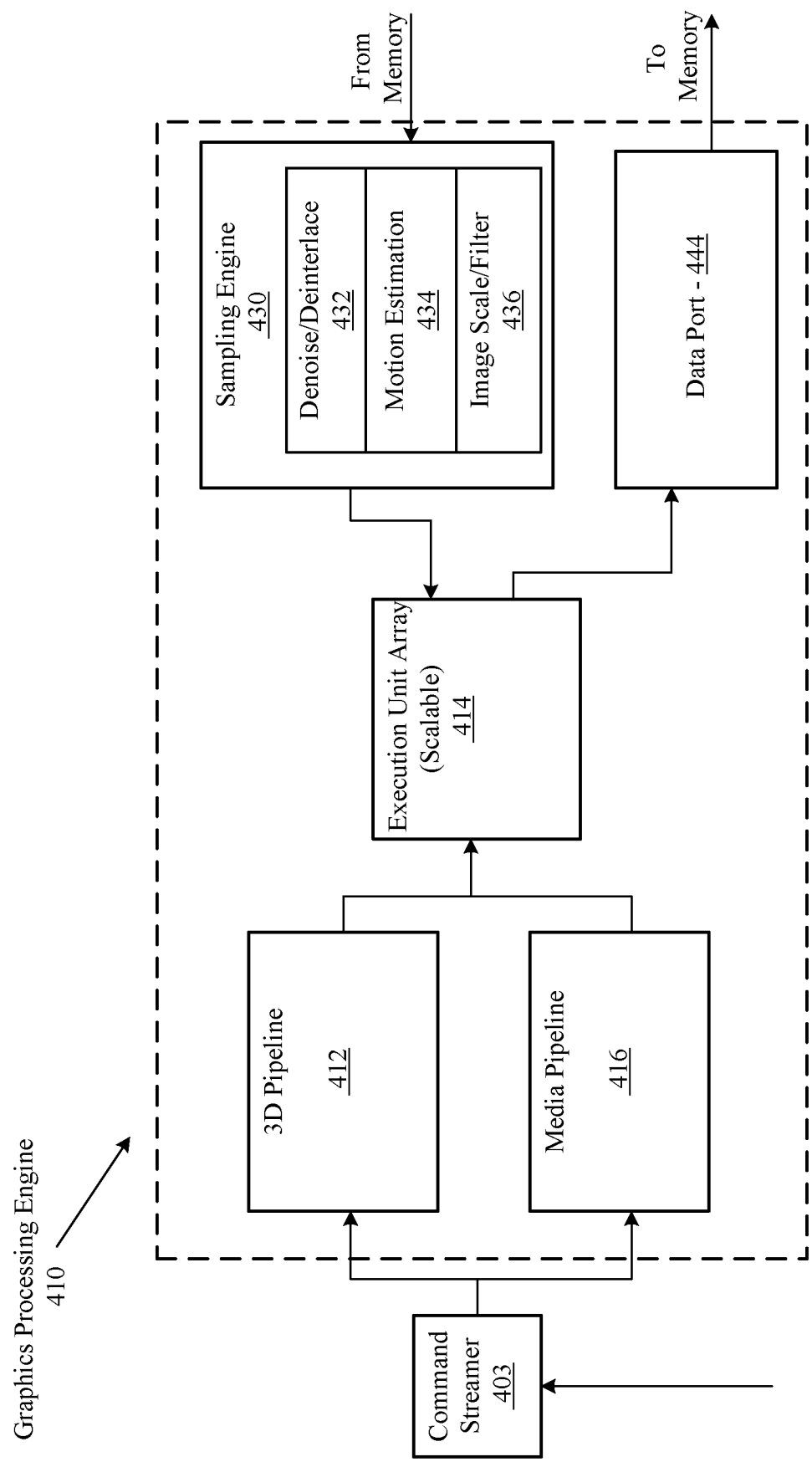
FIG. 12 is a block diagram of an example of a graphics processing engine according to an embodiment.

FIG. 12 is a block diagram of a graphics processing engine 410 of a graphics processor in accordance with some embodiments. In one embodiment, the GPE 410 is a version of the GPE 310 shown in FIG. 11. Elements of FIG. 12 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 13:
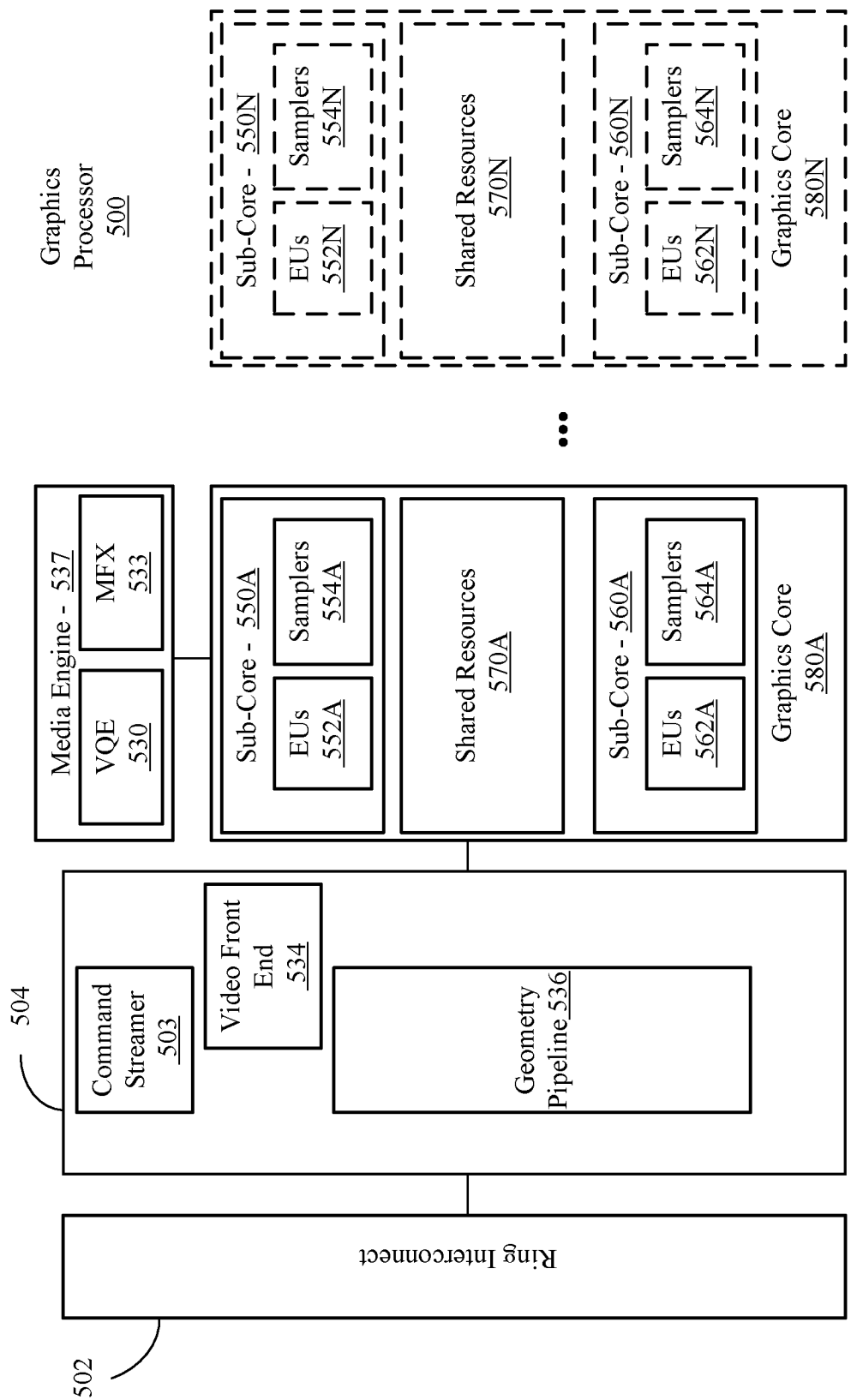

FIG. 13 is a block diagram of another embodiment of a graphics processor 500. Elements of FIG. 13 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores.

In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 14:
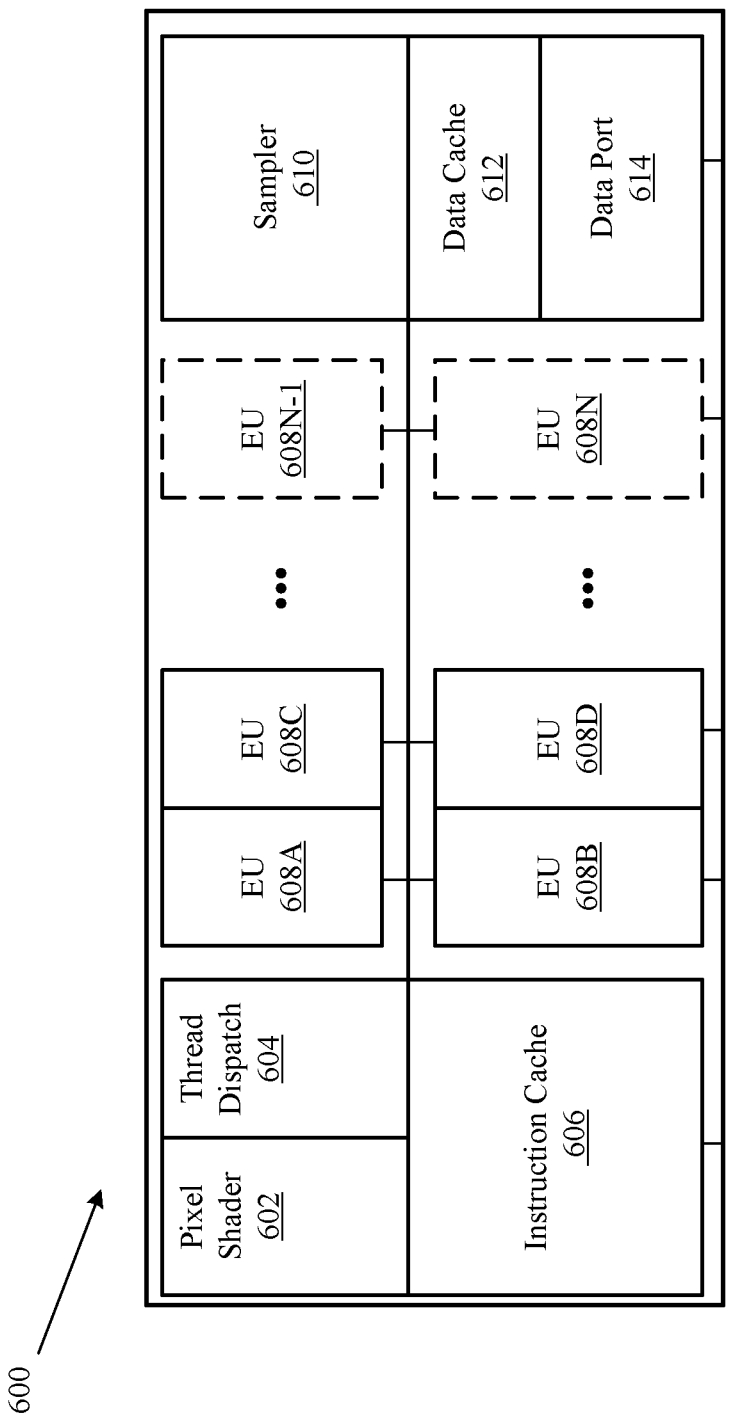

FIG. 14 illustrates thread execution logic 600 including an array of processing elements employed in some embodiments of a GPE. Elements of FIG. 14 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 13) dispatches vertex processing, tessellation, or geometry processing threads to thread execution logic 600 (FIG. 14). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 15 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 16:
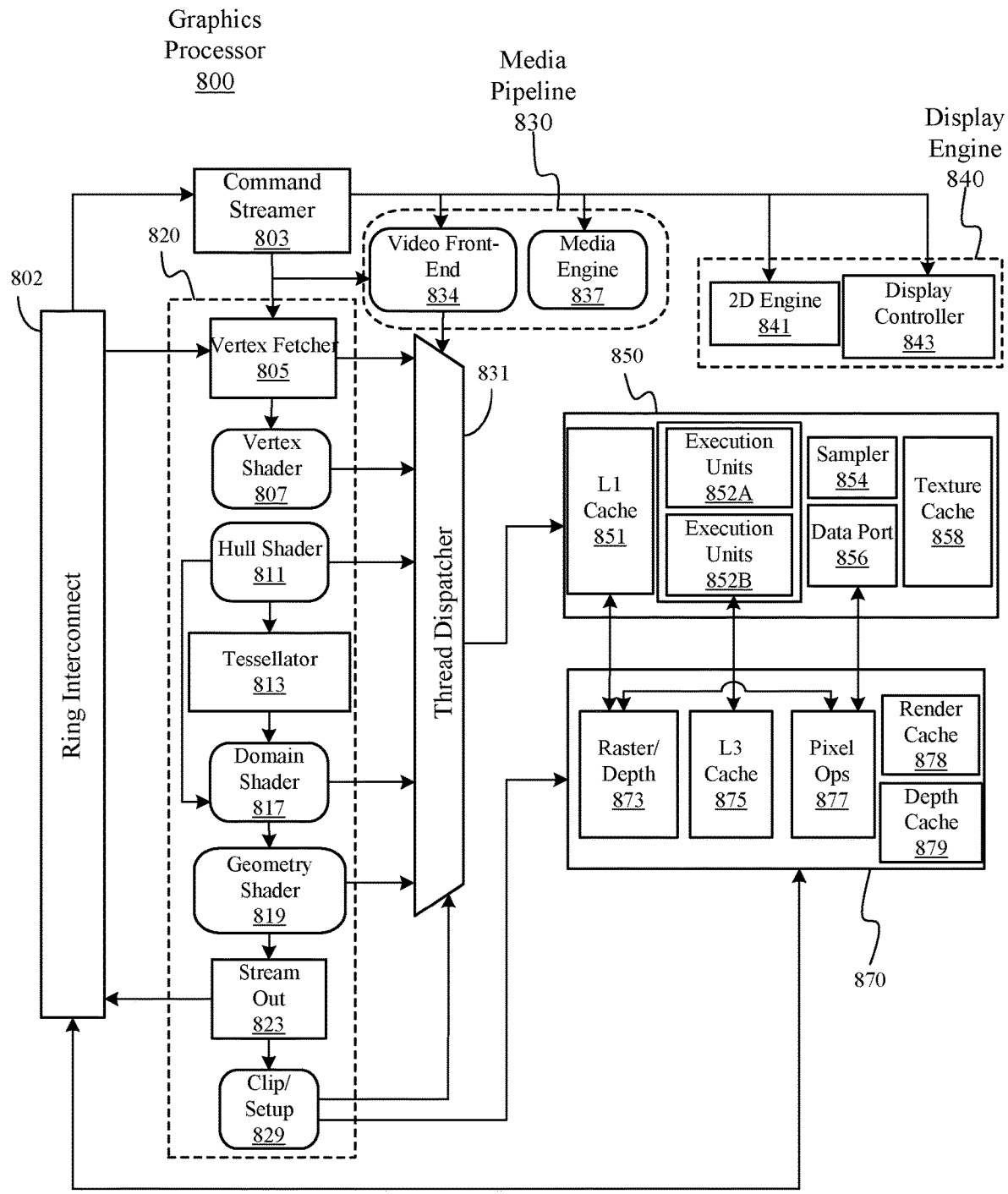
FIG. 16 is a block diagram of an example of a graphics pipeline according to an embodiment.

FIG. 16 is a block diagram of another embodiment of a graphics processor 800. Elements of FIG. 16 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 17A is a block diagram illustrating a graphics processor command format 900 according to some embodiments. FIG. 17B is a block diagram illustrating a graphics processor command sequence 910 according to an embodiment. The solid lined boxes in FIG. 17A illustrate the components that are generally included in a graphics command while the dashed lines include components that are optional or that are only included in a sub-set of the graphics commands. The exemplary graphics processor command format 900 of FIG. 17A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 17B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 18:
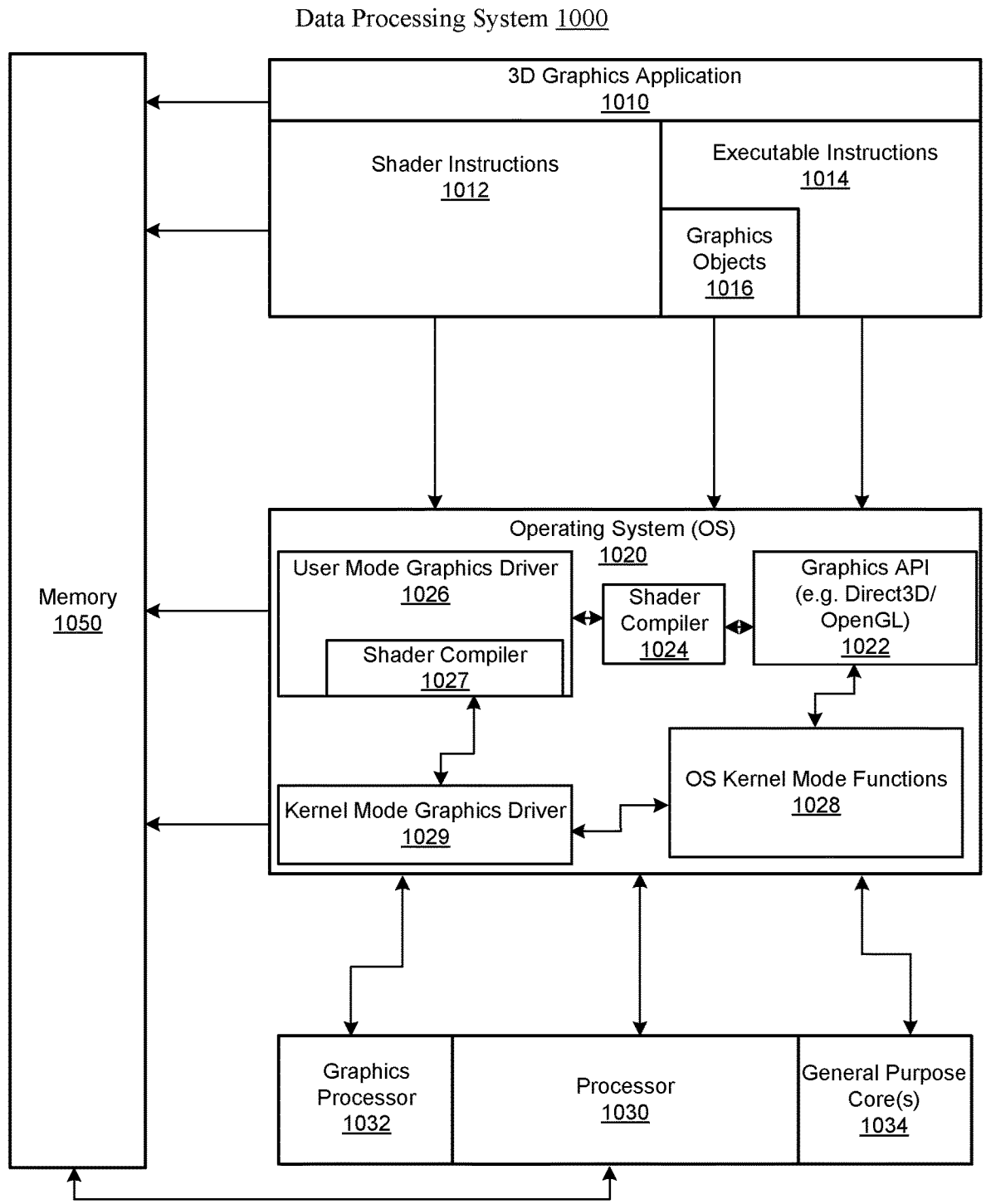
FIG. 18 is a block diagram of an example of a graphics software architecture according to an embodiment.

FIG. 18 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 19:
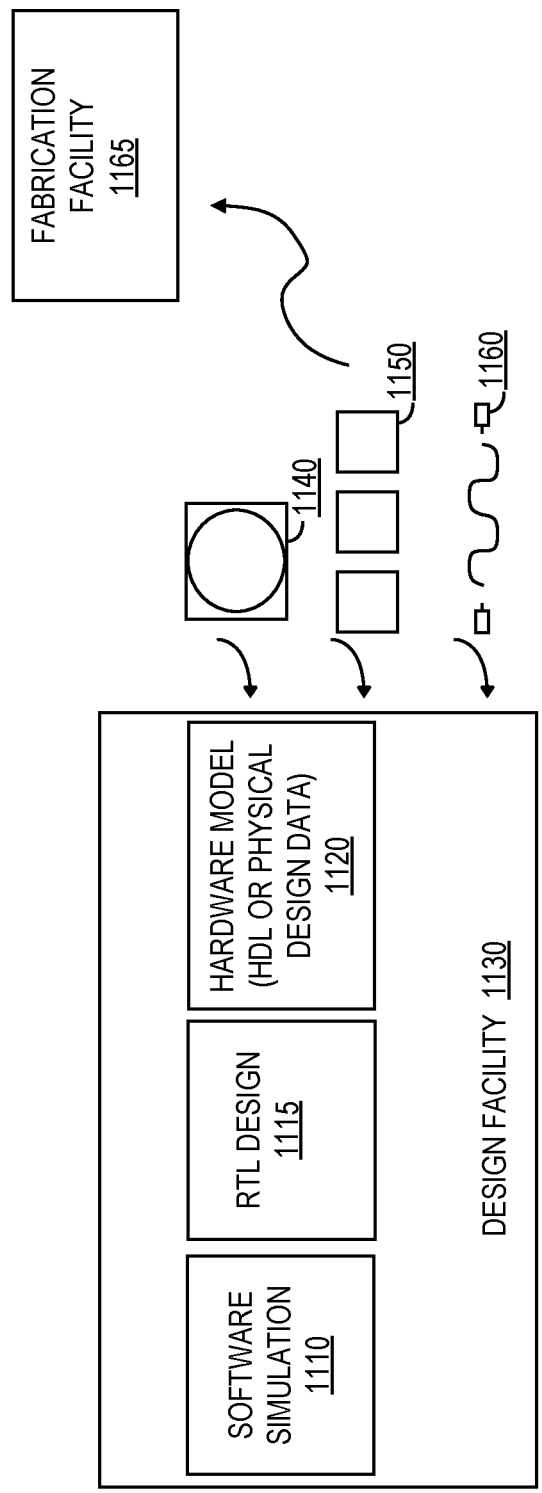
FIG. 19 is a block diagram of an example of an intellectual property (IP) core development system according to an embodiment.

FIG. 19 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 11001112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data.

The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 20:
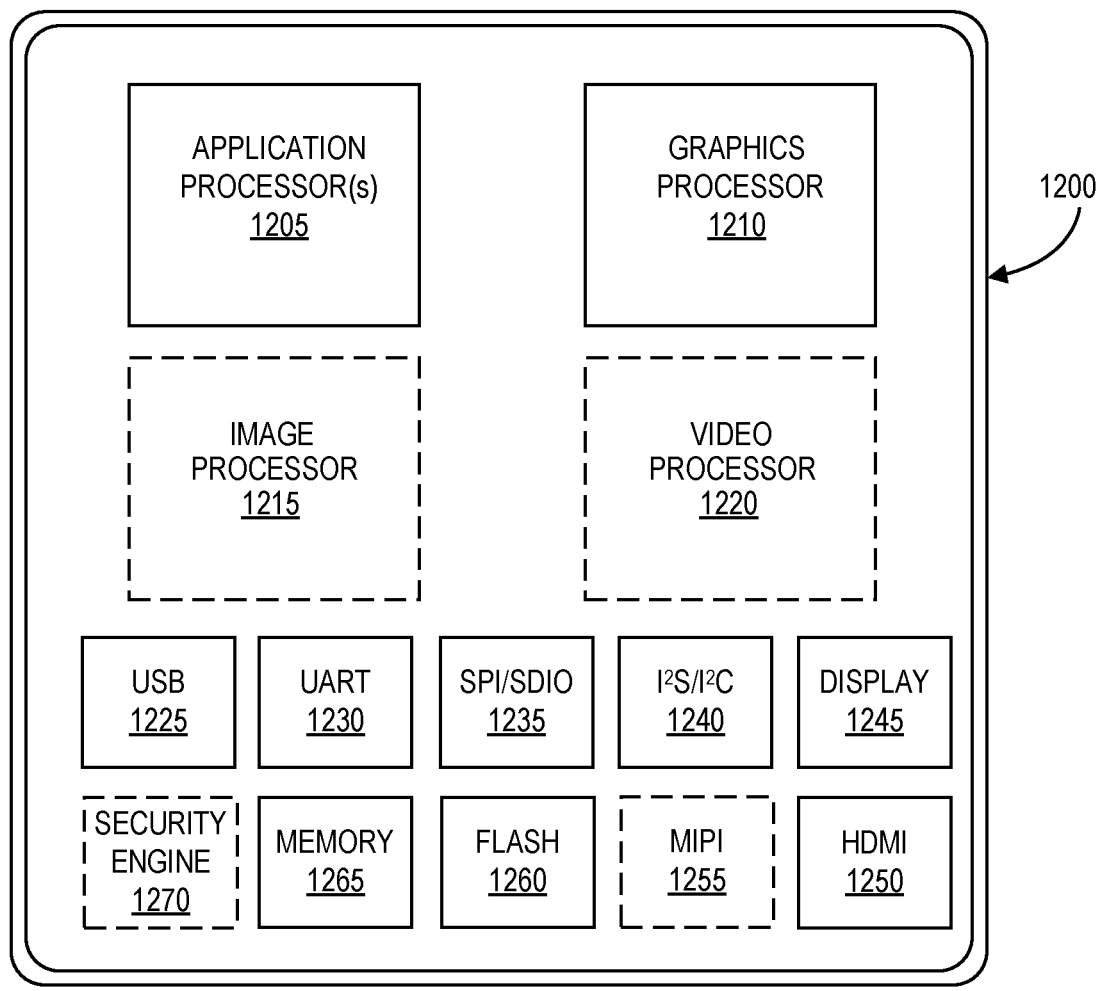
FIG. 20 is a block diagram of an example of a system on a chip integrated circuit according to an embodiment.

FIG. 20 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Additional Notes and Examples

Example 1 may include a performance-enhanced computing system including a display device to present a displayable frame, a graphics processor to provide the displayable frame to the display device via a device driver; and a microcontroller to control a workload of the graphics processor, determine if at least one predetermined condition is met, and instruct, if the at least one predetermined condition is met, the graphics processor to transform an initial frame into an intermediate frame to be provided as the displayable frame to the display device.

Example 2 may include the system of example 1, wherein the microcontroller includes an internal timer that is to reset if a frame has been received by the microcontroller and then begin to count, and wherein the microcontroller is to determine that the at least one predetermined condition is met if the internal timer has reached a predetermined value and the microcontroller has not received another frame.

Example 3 may include the system of example 1, wherein the microcontroller is to detect whether the at least one predetermined condition is met based on one or more of a time until a next vertical blank interval of the display device, a render time estimate for frames, sensor data of the display device, a frames per second rendered by the graphics processor or a perceived frames per second.

Example 4 may include the system of example 3, wherein the microcontroller is to determine that the at least one predetermined condition is met if the sensor data indicates that a movement of the display device corresponds to a rotational movement, the perceived frames per second is greater than the frames per second rendered by the graphics processor, and the time until the next vertical blank interval is less than the render time estimate.

Example 5 may include the system of example 4, wherein the initial frame was previously presented on the display device.

Example 6 may include the system of example 1, wherein the microcontroller is to determine that the at least one predetermined condition is met if display device frame rotation sensor data, corresponding to a generation of the initial frame, is not the same as a display device latest rotation sensor data.

Example 7 may include the system of example 6, wherein the initial frame was not presented by the display device.

Example 8 may include the system of any one of example 1-7, wherein the microcontroller is a part of the graphics processor.

Example 9 may include a graphics processing apparatus, including a microcontroller to control a workload of a graphics processor, determine if at least one predetermined condition is met, and instruct if the at least one predetermined condition is met, the graphics processor to transform an initial frame into an intermediate frame.

Example 10 may include the apparatus of example 9, wherein the microcontroller includes an internal timer that is to reset if a frame has been received by the microcontroller and then begin to count, and wherein the microcontroller is to determine that the at least one predetermined condition is met if the internal timer has reached a predetermined value, and the microcontroller has not received another frame.

Example 11 may include the apparatus of example 9, wherein the microcontroller is to detect whether the at least one predetermined condition is met based on one or more of a time until a next vertical blank interval of a display device, a render time estimate for frames, sensor data of the display device, a frames per second rendered by the graphics processor or a perceived frames per second.

Example 12 may include the apparatus of example 11, wherein the microcontroller is to determine that the at least one predetermined condition is met if the sensor data indicates that a movement of the display device corresponds to a rotational movement, the perceived frames per second is greater than the frames per second rendered by the graphics processor, and the time until the next vertical blank interval is less than the render time estimate.

Example 13 may include the apparatus of example 12, wherein the initial frame was previously presented on a display device.

Example 14 may include the apparatus of example 9, wherein the microcontroller is to determine that the at least one predetermined condition is met if display device frame rotation sensor data, corresponding to a generation of the initial frame, is not the same as a display device latest rotation sensor data.

Example 15 may include the apparatus of example 14, wherein the initial frame was not presented by the display device.

Example 16 may include the apparatus of any one of examples 9-15, wherein the microcontroller is a part of the graphics processor.

Example 17 may include a method of controlling frame generation, including controlling, with a microcontroller, a workload of a graphics processor, determining, with the microcontroller, if at least one predetermined condition is met, and instructing with the microcontroller, if the at least one predetermined condition is met, the graphics processor to transform an initial frame into an intermediate frame.

Example 18 may include the method of example 17, further including if a frame has been received by the microcontroller, resetting an internal timer of the microcontroller and then starting the timer, wherein the determining includes determining that the at least one predetermined condition is met if the internal timer has reached a predetermined value, and the microcontroller has not received another frame.

Example 19 may include the method of example 17, wherein the determining includes the microcontroller detecting whether the at least one predetermined condition is met based on one or more of a time until a next vertical blank interval of a display device, a render time estimate for frames, sensor data of the display device, a frames per second rendered by the graphics processor or a perceived frames per second.

Example 20 may include the method of example 19, wherein the determining includes detecting that the at least one predetermined condition is met if the sensor data indicates that a movement of the display device corresponds to a rotational movement, the perceived frames per second is greater than the frames per second rendered by the graphics processor, and the time until the next vertical blank interval is less than the render time estimate.

Example 21 may include the method of example 20, further including displaying the initial frame on a display device before the determining.

Example 22 may include the method of example 17, wherein the determining includes the microcontroller detecting that the at least one predetermined condition is met if display device frame rotation sensor data, corresponding to a generation of the initial frame, is not the same as a display device latest rotation sensor data.

Example 23 may include the method of example 22, wherein the initial frame was not presented by the display device.

Example 24 may include the method of any one of examples 17-23, wherein the microcontroller is a part of the graphics processor.

Example 25 may include a graphics processing apparatus, including a microcontroller means including means for controlling a workload of a graphics processor means, means for determining if at least one predetermined condition is met, and means for, if the at least one predetermined condition is met, instructing the graphics processor means so that the graphics processor means is for transforming an initial frame into an intermediate frame.

Example 26 may include the apparatus of example 25, wherein the microcontroller means includes means for resetting an internal timer if a frame has been received by the microcontroller means, then for starting the timer, and means for determining that the at least one predetermined condition is met if the internal timer has reached a predetermined value, and the microcontroller means has not received another frame.

Example 27 may include the apparatus of example 25, wherein the microcontroller means includes means for determining that the at least one predetermined condition is met based on one or more of a time until a next vertical blank interval of a display device means, a render time estimate for frames, sensor data of the display device means, a frames per second rendered by the graphics processor means or a perceived frames per second.

Example 28 may include the apparatus of example 27, wherein the microcontroller means includes means for determining that the at least one predetermined condition is met if the sensor data indicates that a movement of the display device means corresponds to a rotational movement, the perceived frames per second is greater than the frames per second rendered by the graphics processor means, and the time until the next vertical blank interval is less than the render time estimate.

Example 29 may include the apparatus of example 28, further including means for displaying the initial frame.

Example 30 may include the apparatus of example 25, wherein the microcontroller means includes means for determining that the at least one predetermined condition is met if display device means frame rotation sensor data, corresponding to a generation of the initial frame, is not the same as a display device means latest rotation sensor data.

Example 31 may include the apparatus of example 25, wherein the initial frame was not presented by a display means.

Example 32 may include the apparatus of any one of examples 25-31, wherein the microcontroller means is a part of the graphics processor means.

Technology described herein may therefore enable a better VR experience in which users are able to read text more easily. Indeed, the technology may improve operation of the HMD system so that the entire scene may be rendered in a sharper fashion.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a display device to present a displayable frame;
a graphics processor to provide the displayable frame to the display device; and
a microcontroller to:
control a workload of the graphics processor,
determine if a plurality of predetermined conditions is met, wherein the microcontroller is to determine that a first condition of the plurality of predetermined conditions is met when a time until a next vertical blank interval of the display device is less than a render time estimate for a frame, and a second condition of the plurality of predetermined conditions is met if a target application frames per second is greater than a frames per second rendered by the graphics processor,
instruct, in response to an identification that each of the plurality of predetermined conditions is met, the graphics processor to transform an initial frame into an intermediate frame to be provided as the displayable frame to the display device, and determine that the plurality of predetermined conditions is unmet in response to an identification that one or more of the first condition or the second condition is unmet.

2. The system of claim 1, wherein the microcontroller includes an internal timer that is to reset if a frame has been received by the microcontroller and then begin to count, and wherein the microcontroller is to determine that a third condition of the plurality of predetermined conditions is met if the internal timer has reached a predetermined value and the microcontroller has not received another frame.

3. The system of claim 1, wherein the microcontroller is to detect whether the plurality of predetermined conditions is met based on sensor data of the display device.

4. The system of claim 3, wherein the microcontroller is to determine that:
a third condition of the plurality of predetermined conditions is met if the sensor data indicates that a movement of the display device corresponds to a rotational movement;
the plurality of predetermined conditions is met in response to an identification that each of the first, second and third conditions are met; and
the plurality of predetermined conditions is unmet in response to an identification that the third condition is unmet.

5. The system of claim 4, wherein the initial frame was previously presented on the display device.

6. The system of claim 1, wherein the microcontroller is to determine that a third condition of the plurality of predetermined conditions is met if display device frame rotation sensor data, corresponding to a generation of the initial frame, is not the same as display device latest rotation sensor data.

7. The system of claim 6, wherein the initial frame was not presented by the display device.

8. The system of claim 1, wherein the microcontroller is a part of the graphics processor.

9. An apparatus, comprising:
a microcontroller to:
control a workload of a graphics processor,
determine if a plurality of predetermined conditions is met, wherein the microcontroller is to determine that a first condition of the plurality of predetermined conditions is met when a time until a next vertical blank interval of a display device is less than a render time estimate for a frame, and a second condition of the plurality of predetermined conditions is met if a target application frames per second is greater than a frames per second rendered by the graphics processor,
instruct in response to an identification that each of the plurality of predetermined conditions is met, the graphics processor to transform an initial frame into an intermediate frame, and
determine that the plurality of predetermined conditions is unmet in response to an identification that one or more of the first condition or the second condition is unmet.

10. The apparatus of claim 9, wherein the microcontroller includes an internal timer that is to reset if a frame has been received by the microcontroller and then begin to count, and wherein the microcontroller is to determine that a third condition of the plurality of predetermined conditions is met if the internal timer has reached a predetermined value, and the microcontroller has not received another frame.

11. The apparatus of claim 9, wherein the microcontroller is to detect whether the plurality of predetermined conditions is met based on sensor data of the display device.

12. The apparatus of claim 11, wherein the microcontroller is to determine that:
a third condition of the plurality of predetermined conditions is met if the sensor data indicates that a movement of the display device corresponds to a rotational movement;
the plurality of predetermined conditions is met in response to an identification that each of the first, second and third conditions are met; and
the plurality of predetermined conditions is unmet in response to an identification that the third condition is unmet.

13. The apparatus of claim 12, wherein the initial frame was previously presented on the display device.

14. The apparatus of claim 9, wherein the microcontroller is to determine that a third condition of the plurality of predetermined conditions is met if display device frame rotation sensor data, corresponding to a generation of the initial frame, is not the same as display device latest rotation sensor data.

15. The apparatus of claim 14, wherein the initial frame was not presented by the display device.

16. The apparatus of claim 9, wherein the microcontroller is a part of the graphics processor.

17. A method of controlling frame generation, comprising:
controlling, with a microcontroller, a workload of a graphics processor;
determining, with the microcontroller, if a plurality of predetermined conditions is met, wherein the determining includes determining that a first condition of the plurality of predetermined conditions is met when a time until a next vertical blank interval of a display device is less than a render time estimate for a frame, and a second condition of the plurality of predetermined conditions is met if a target application frames per second is greater than a frames per second rendered by the graphics processor;
instructing with the microcontroller, in response to an identification that each of the plurality of predetermined conditions is met, the graphics processor to transform an initial frame into an intermediate frame; and
determining that the plurality of predetermined conditions is unmet in response to an identification that one or more of the first condition or the second condition is unmet.

18. The method of claim 17, further comprising:
if a frame has been received by the microcontroller, resetting an internal timer of the microcontroller and then starting the internal timer,
wherein the determining includes determining that a third condition of the plurality of predetermined conditions is met if the internal timer has reached a predetermined value, and the microcontroller has not received another frame.

19. The method of claim 17, wherein the determining if the plurality of predetermined conditions is met includes the microcontroller detecting whether the plurality of predetermined conditions is met based on-sensor data of the display device.

20. The method of claim 19, wherein the determining includes:

detecting that a third condition of the plurality of predetermined conditions is met if the sensor data indicates that a movement of the display device corresponds to a rotational movement;

determining that the plurality of predetermined conditions is met in response to an identification that each of the first, second and third conditions are met; and determining that the plurality of predetermined condition is unmet in response to an identification that the third condition is unmet.

21. The method of claim 20, further comprising displaying the initial frame on the display device before the determining if the plurality of predetermined conditions is met.

22. The method of claim 17, wherein the determining if the plurality of predetermined conditions is met includes the microcontroller detecting that a third condition of the plurality of predetermined conditions is met if display device frame rotation sensor data, corresponding to a generation of the initial frame, is not the same as display device latest rotation sensor data.

23. The method of claim 22, wherein the initial frame was not presented by the display device.

24. The method of claim 17, wherein the microcontroller is a part of the graphics processor.

* * * * *